US012565313B2

(12) United States Patent
Li et al.

(10) Patent No.: US 12,565,313 B2
(45) Date of Patent: Mar. 3, 2026

(54) MATERIAL DELIVERY SYSTEMS AND METHODS

(71) Applicant: FMC CORPORATION, Philadelphia, PA (US)

(72) Inventors: Xuan Li, Philadelphia, PA (US); Edward Brinton Lang, Philadelphia, PA (US); Mark Jefferson Whitley, Philadelphia, PA (US); Darryl A. Meade, Philadelphia, PA (US)

(73) Assignee: FMC CORPORATION, Philadelphia, PA (US)

( * ) Notice: Subject to any disclaimer, the term of this patent is extended or adjusted under 35 U.S.C. 154(b) by 0 days.

(21) Appl. No.: 18/720,342

(22) PCT Filed: Dec. 15, 2022

(86) PCT No.: PCT/US2022/052970
§ 371 (c)(1),
(2) Date: Jun. 14, 2024

(87) PCT Pub. No.: WO2023/114373
PCT Pub. Date: Jun. 22, 2023

(65) Prior Publication Data
US 2025/0051006 A1 Feb. 13, 2025

Related U.S. Application Data

(60) Provisional application No. 63/290,906, filed on Dec. 17, 2021.

(51) Int. Cl.
*B64D 1/02* (2006.01)

(52) U.S. Cl.
CPC ..................................... *B64D 1/02* (2013.01)

(58) Field of Classification Search
CPC ........... A01C 7/04; A01C 7/042; A01C 7/044; A01C 7/0443; A01C 7/0445; A01C 7/046;
(Continued)

(56) References Cited

U.S. PATENT DOCUMENTS 9,382,003 B2 * 7/2016 Burema ................. B64U 10/00
10,814,980 B2 10/2020 Zvara
(Continued)

FOREIGN PATENT DOCUMENTS

CN 105173084 A 12/2015
DE 102011121680 A1 * 6/2013 ............... B64D 1/02
WO 2021/007632 A1 1/2021

OTHER PUBLICATIONS

International Search report for PCT/US2022/052970 mailed on Mar. 29, 2023.
(Continued)

*Primary Examiner* — Joshua E Rodden
(74) *Attorney, Agent, or Firm* — FMC CORPORATION

(57) ABSTRACT

Described herein is an aerial material delivery system, which includes an unmanned aerial vehicle (UAV) and a material dispensing assembly mounted to the UAV. The material dispensing assembly includes a rotary cartridge defining a plurality of channels extending parallel to a longitudinal axis of the rotary cartridge, each channel retaining a respective set of tablets therein, an indexing motor configured to index the channels, and a dispenser configured to dispense a single tablet at a time from the rotary cartridge to a target location. Methods of operating such a system are also described.

17 Claims, 20 Drawing Sheets

(58) Field of Classification Search
  CPC ....... A01C 19/00; A01C 19/02; A01C 21/002;
          B64D 1/00; B64D 1/02; B64D 1/04;
          B64D 1/06; B64D 1/08; B64D 1/10;
          B64D 1/12; B64D 1/14; B64D 2101/40;
          B64D 2101/45; B64D 2101/47
  USPC ...................................................... 244/118.1
  See application file for complete search history.

(56)                References Cited

U.S. PATENT DOCUMENTS

| 11,337,358 | B2 * | 5/2022 | Fletcher | B64U 10/14 |
|---|---|---|---|---|
| 11,470,764 | B2 * | 10/2022 | Aghai | H02M 3/33507 |
| 12,207,588 | B2 * | 1/2025 | Thota | B64D 1/02 |
| 2017/0273293 | A1 * | 9/2017 | Williams | B65D 83/0409 |
| 2017/0334559 | A1 * | 11/2017 | Bouffard | B64U 20/87 |
| 2019/0092471 | A1 * | 3/2019 | Lepek | A01K 67/31 |
| 2022/0007567 | A1 * | 1/2022 | Reabow | A01C 21/005 |
| 2022/0324564 | A1 * | 10/2022 | Meade | B65D 83/771 |

OTHER PUBLICATIONS

Search report for international patent application PCT/US2022/052970.

* cited by examiner

242

244

244

314

380

112'

384

340

370

340

376

374

360

382

α

372

378

500

502 — PROVIDE A MATERIAL DISPENSING ASSEMBLY

504 — RELEASABLY MOUNT MATERIAL DISPENSING ASSEMBLY TO UAV

506 — DISPENSE TABLETS FROM UAV TO TARGET LOCATION USING MATERIAL DISPENSING ASSEMBLY

MATERIAL DELIVERY SYSTEMS AND METHODS

CROSS-REFERENCE TO RELATED APPLICATIONS

This application claims the benefit of U.S. Provisional Application No. 63/290,906 filed Dec. 17, 2021.

BACKGROUND

This disclosure is directed to material delivery systems, and more specifically to material delivery systems and methods for dispensing products in tablet-based forms.

Use of drones or unmanned aerial vehicles (UAVs) in agricultural applications, such as for treating fields with chemical products, is rapidly expanding. A container of chemical products is coupled to the UAV and a material dispensing system mounted to the UAV, and the UAV is piloted above the area to be treated while the chemical product is dispensed.

A need exists for more efficient and precise control of chemical product dispersal in tablet form, using a UAV.

BRIEF DESCRIPTION

In one aspect, an aerial material delivery system includes an unmanned aerial vehicle (UAV) and a material dispensing assembly mounted to the UAV. The material dispensing assembly includes a rotary cartridge defining a plurality of channels extending parallel to a longitudinal axis of the rotary cartridge, each channel retaining a respective set of tablets therein, an indexing motor configured to index the channels, and a dispenser configured to dispense a single tablet at a time from the rotary cartridge to a target location.

In another aspect, a method includes providing a material dispensing assembly including a rotary cartridge defining a plurality of channels extending parallel to a longitudinal axis of the rotary cartridge, each channel retaining a respective set of tablets therein, an indexing motor configured to index the channels, and a dispenser. The method also includes releasably mounting the material dispensing assembly to an unmanned aerial vehicle (UAV), and dispensing the tablets from the UAV to a target location using the material dispensing assembly.

DETAILED DESCRIPTION OF THE DISCLOSURE

The present disclosure is generally related to material delivery systems for dispensing products in tablet-based forms. In specific embodiments, the present disclosure is directed to material delivery systems that include a rotary cartridge configured to retain tablet-based chemical products therein, the cartridge mounted to an unmanned aerial vehicle (UAV) or drone. The material delivery systems further include at least one dispenser configured to dispense a tablet from the rotary cartridge in a predictable dispensing direction and speed. Thereby, the material delivery systems can be implemented to efficiently, accurately, and precisely disperse tablet-based chemical products at a target location.

Figure 1:
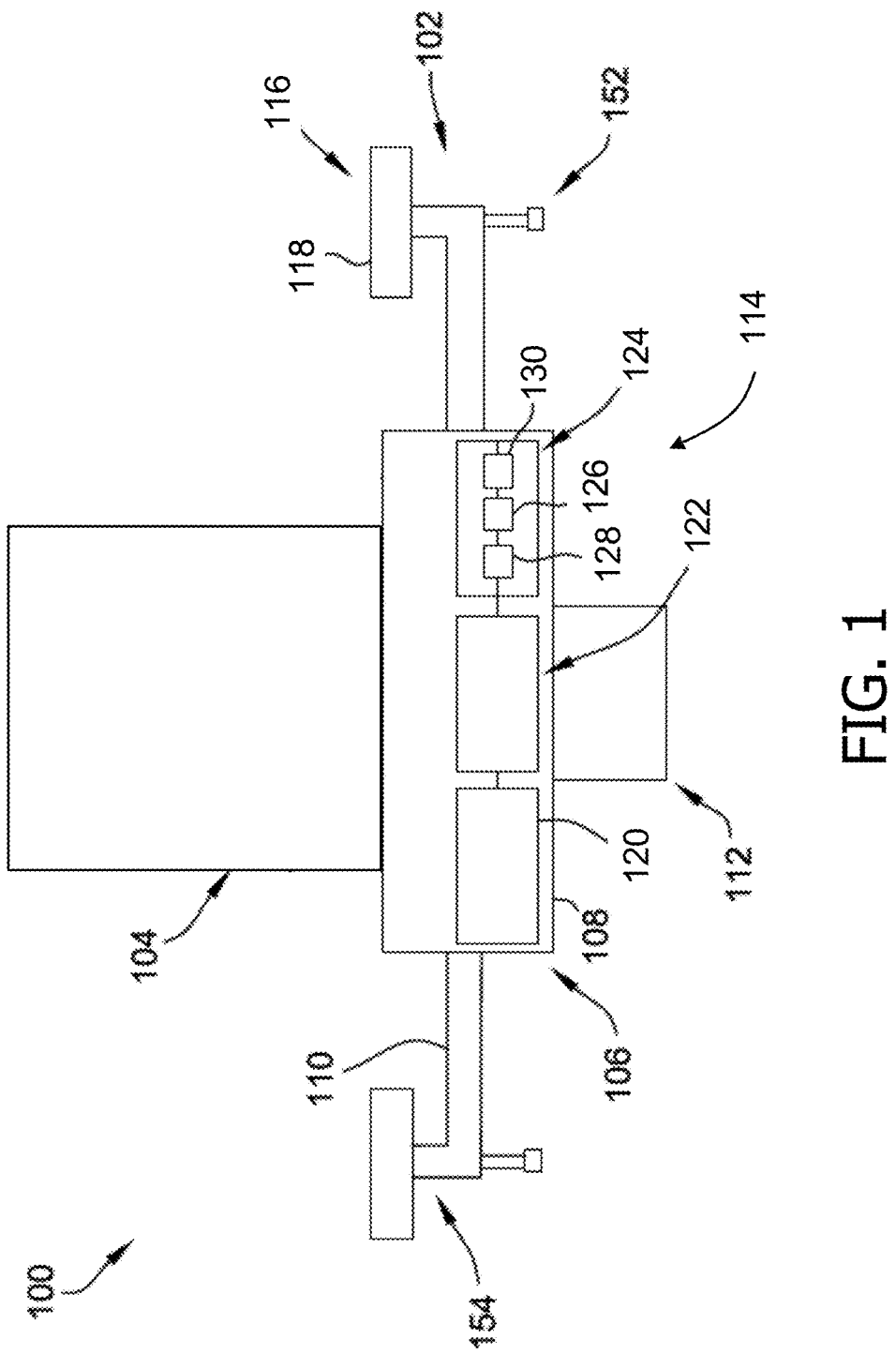
FIG. 1 is a schematic view of an exemplary aerial material delivery system.

FIG. 1 illustrates a schematic diagram of an exemplary aerial material or chemical delivery system 100 in accordance with the present disclosure. In the example embodiment, the aerial material delivery system 100 is implemented using an unmanned aerial vehicle (UAV) or drone 102. As used herein, UAV refers generally to any unmanned or remotely piloted vehicle or system. The aerial material delivery system 100 includes the UAV 102 and a rotary cartridge 104 mounted thereto. The rotary cartridge 104 includes a plurality of tablet-based chemical products—also referred to herein more generally as "tablets," not shown in FIG. 1—to be dispensed using the aerial material delivery system 100.

The UAV 102 includes a body 106 generally defined by a hub 108 and a plurality of spoke-like arms 110. In the example embodiment, the rotary cartridge 104 is releasably or removably mounted to the UAV body 106. At least one dispenser 112 for dispensing tablets from the rotary cartridge 104 is mounted to the rotary cartridge 104 and/or to the UAV body 106. The rotary cartridge 104 containing the tablets and the dispenser(s) 112 may be collectively referred to as a material dispensing assembly 114 of the material delivery system 100.

The UAV 102 also includes a propulsion system 116 for generating lift to facilitate flight of the UAV 102. The propulsion system 116 may generally include any suitable propulsion system that enables the UAV 102 to function as described herein. In the illustrated embodiment, the propulsion system 116 is a rotary-wing propulsion system that includes a plurality of rotors 118, which may include variable- or fixed-pitch blades. Although the UAV 102 is shown and described as a rotary-wing UAV, it should be understood that the systems and methods described herein may be implemented on UAVs other than rotary-wing UAVs, including fixed-wing UAVs. In such embodiments, the propulsion system 116 may include propellers in addition to or as an alternative to rotors 118.

The propulsion system 116 also includes one or more motors 120 operatively coupled to the rotors 118 and configured to drive or rotate the rotors 118 in response to a control signal. Although only one motor 120 is illustrated in FIG. 1, it should be understood that the propulsion system 116 may include any suitable number of motors that enable the UAV 102 to function as described herein. In some embodiments, for example, each rotor 118 has a dedicated motor operatively connected thereto for controlling rotation of the respective rotor 118. Moreover, the motors 120 may be any suitable motor that enables the propulsion system 116 to function as described herein, including, for example and without limitation, electric motors and gasoline-powered engines.

To activate the propulsion system 116, a control signal is sent to the motors 120 (e.g., from a controller 124, described further herein). The motors 120 activate the rotors 118, causing the rotors 118 to rotate and generate lift. Control of the UAV 102 may be achieved, for example, by varying the relative speed of each rotor 118, to change the thrust and torque produced thereby.

The aerial material delivery system 100 further includes a power source 122 operatively coupled to the UAV body 106 and configured to provide power to the UAV 102 (e.g., to the motors 120, the controller 124, etc.) and/or the material dispensing assembly 114 to perform the functions described herein (e.g., flying, dispensing material, etc.). In the example embodiment, the power source 122 includes a battery, which should be understood to include a single battery, multiple batteries, a battery pack, and the like.

In addition, the UAV 102 includes an on-board controller or computer 124 coupled in operative control communication with various components of the aerial material delivery system 100 (e.g., the UAV 102 and the material dispensing assembly 114 and facilitating various electronic and/or automatic control thereof. For example, the controller 124 is configured to control the UAV 102 and the material dispensing assembly 114 according to stored or received controls. The controller 124 includes at least one processor 126 for executing instructions. In some embodiments, executable instructions are stored in a memory 128. In some embodiments, the processor 126 includes one or more processing units (e.g., in a multi-core configuration). The memory 128 is any device allowing information such as executable instructions and/or other data to be stored and retrieved. Specifically, in some embodiments, the memory 128 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In some embodiments, the controller 124 is coupled to any component of the aerial material delivery system 100 via a wired and/or a wireless connection. In some embodiments, the controller 124 is configured to facilitate activation and control of the propulsion system 116 to control movement of the UAV 102 along a predetermined (e.g., stored) or controlled (e.g., manually piloted by a user) path, and to facilitate activation and deactivation of the material dispensing assembly 114 according to stored or received controls. In one example embodiment, the controller 124 is configured to facilitate operating the UAV 102 such that the UAV 102 flies over a target location, such as a field or rice paddy, and operating the dispenser(s) 112 to dispense tablets contained in the rotary cartridge 104 from the UAV 102 while the UAV 102 is flying over the target location, such that the chemical product(s) in the tablet are applied to the target location.

Accordingly, the controller 124 may include a communication interface 130, which is communicatively couplable to any component of the aerial material delivery system 100 described herein and/or to a remote device that transmits controls for controlling operation of the aerial material delivery system (e.g., a remote control). In some embodiments, the communication interface 130 includes, for example and without limitation, a wired or wireless network adapter or a wireless data transceiver adapted for communication over a radio link (e.g., narrowband or broadband radio links), a cellular or mobile data network (e.g., 3G, 4G, or 5G network technology), or a BLUETOOTH link.

The aerial material delivery system 100 (e.g., the UAV 102 and/or the material dispensing assembly 114) may include additional components, including one or more sensors (e.g., inertial sensors, gyroscopes, accelerometers, GPS sensors, etc.) and/or imaging devices (e.g., cameras, video recorders), in data communication with the controller 142 for operation of the aerial material delivery system 100 (e.g., the UAV 102 and/or the material dispensing assembly 114). For example, the aerial material delivery system 100 may include sensors and/or imaging device for real-time data collection related to any operation of the aerial material delivery system 100, such as, for example, error detection (e.g., abnormal operation of the material dispensing assembly 114, an undispensed tablet, etc.), location determination and control, environmental data (e.g., temperature and/or humidity of the environment and/or of any component of the aerial material delivery system 100), diagnostics, and the like.

The controller 124 may be configured to interpret data from any such sensor or device, for real-time reactive control of the aerial material delivery system 100 in accordance with pre-programmed instructions. For example, the controller 124 may interpret error/diagnostic information and determine that the dispensing pattern was interrupted, and a particular location may need to be re-treated. As another example, the controller 124 may be configured to implement in-flight operation termination. In some instances, the operation termination may include controlling the aerial material delivery system 100 to terminate all product dispensing and return to a base location. In other instances, where a critical anomaly is detected, the operation termination may include controlling the aerial material delivery system 100 to immediately land.

Figure 2:
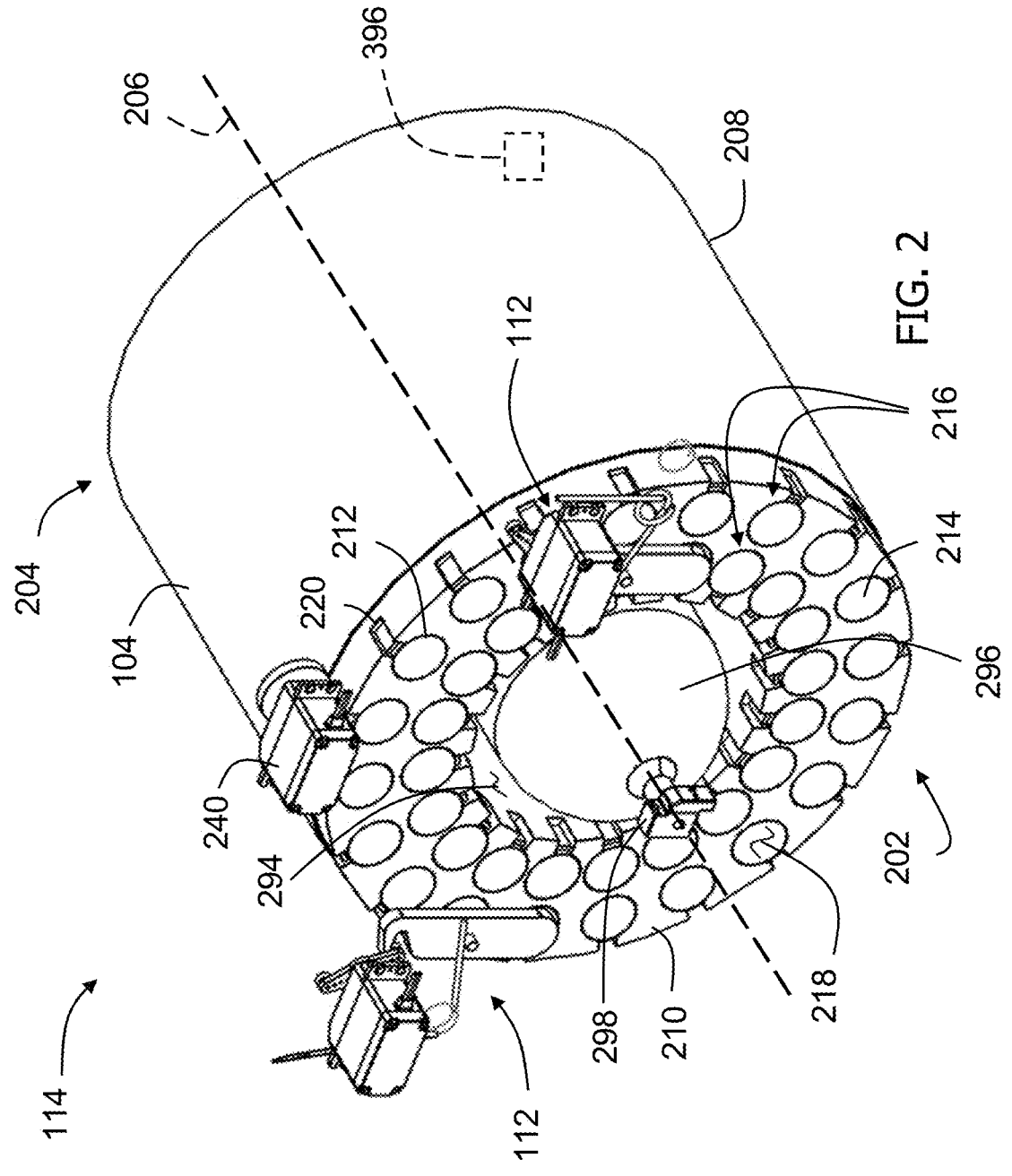
FIG. 2 is a perspective view of an exemplary material dispensing assembly for use with the material delivery system shown in FIG. 1.
Figure 4:
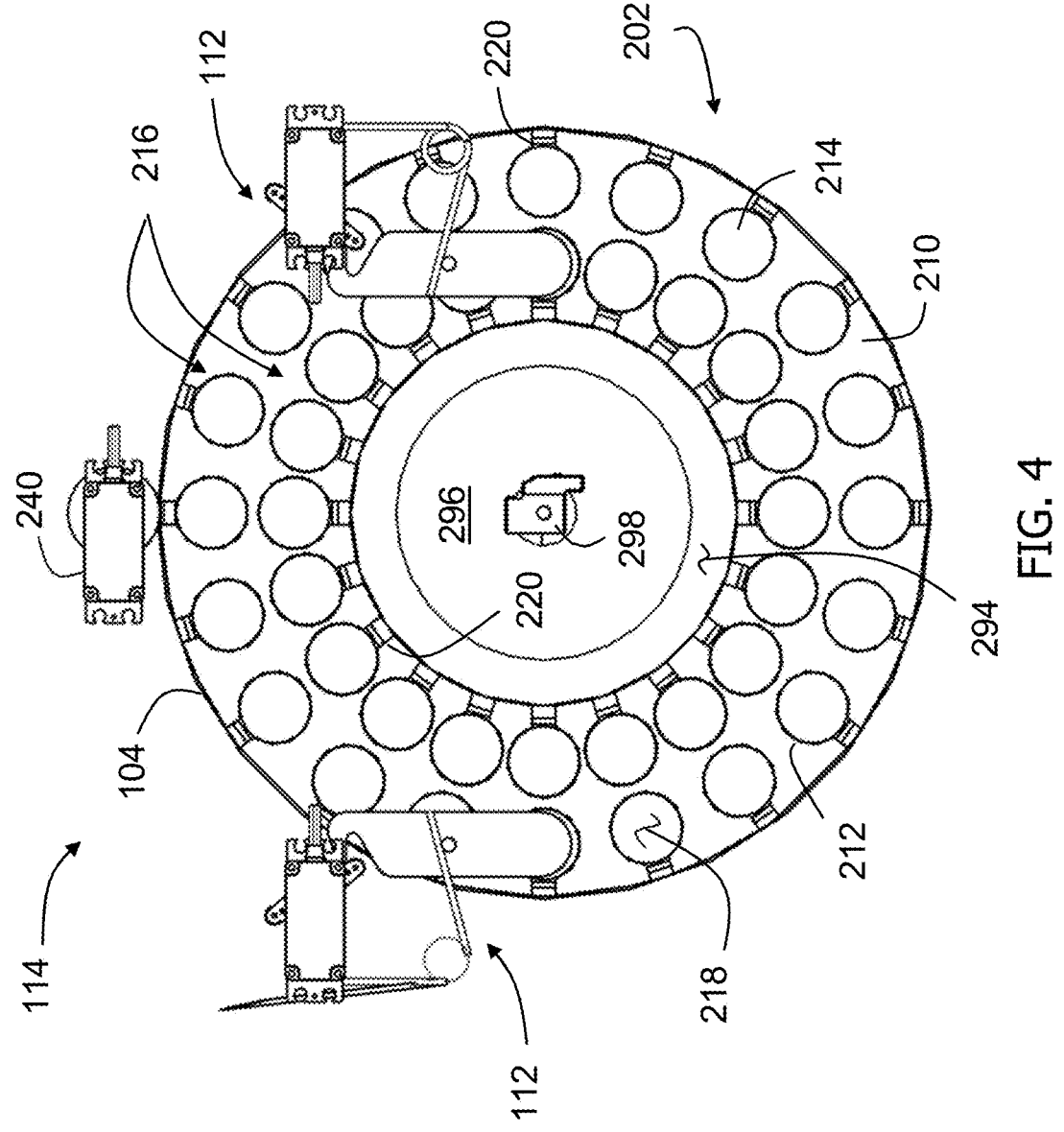
FIG. 4 is an end view of the material dispensing assembly shown in FIG. 2.
Figure 5:
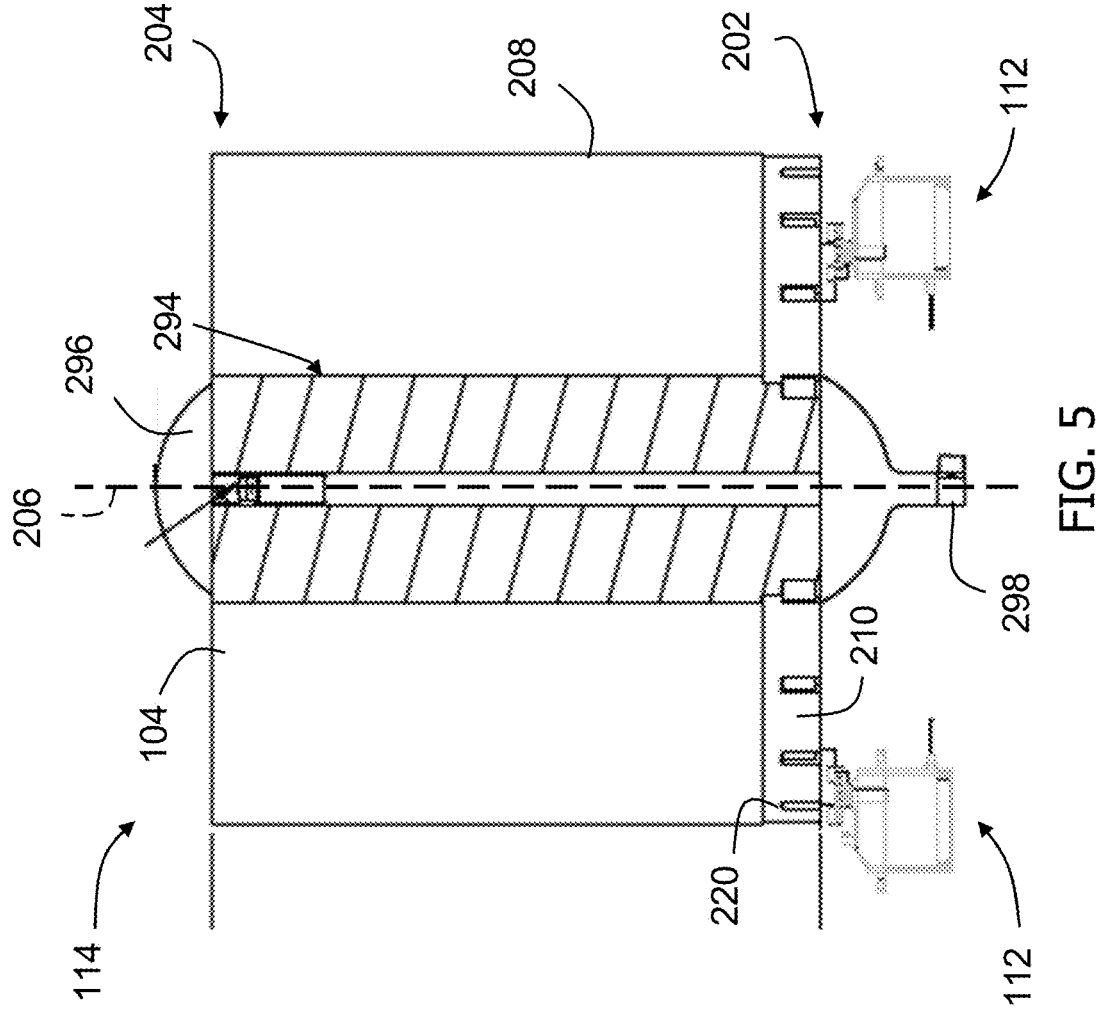
FIG. 5 is a sectional view of the material dispensing assembly shown in FIG. 2.

Turning now to FIGS. 2, 4, and 5, one exemplary embodiment of a material dispensing assembly 114 is depicted. As described above, the material dispensing assembly 114 is coupled to a UAV 102 (not shown in FIGS. 2, 4, and 5) for operation to dispense chemical products at a target location.

In this embodiment, the rotary cartridge 104 is a cylindrical cartridge with a first or bottom end 202 and a second or top end 204. The designation "top" and "bottom" are used herein based on an operational configuration of the rotary cartridge 104 when the rotary cartridge 104 is coupled to the UAV 102 and in use. In this operational configuration, the first end 202 will be facing vertically downwards (e.g., towards a ground surface to be treated), and the second end 204 will be facing vertically upwards. The rotary cartridge 104 extends from the bottom end 202 to the top end 204 along a longitudinal axis 206.

The rotary cartridge 104 includes a cylindrical side wall 208 that surrounds a magazine 210 having defined therein a plurality of longitudinally or axially extending channels 212. Each channel 212 extends from the bottom end 202 to the top end 204 of the rotary cartridge 104; therefore, a bottom end and a top end of each channel 212 generally corresponds to the bottom end 202 and the top end 204, respectively, of the rotary cartridge 104.

Each channel 212 is cylindrical and is configured to retain a plurality of tablets therein 214. In the example embodiment, the tablets 214 in a channel 212 are all oriented parallel to one another and are stacked in a discharge orientation. As used herein, the discharge orientation of the tablets 214 in the present embodiment refers to the orientation depicted in FIG. 2, for example, in which the faces of the tablet 214 are oriented to face in a vertical direction parallel to the longitudinal axis 206.

In some instances, every channel 212 includes the same type of tablet—that is, only one type of tablet, or one chemical product, is contained in the rotary cartridge 104. In other embodiments, the channels 212 may respectively retain different tablets containing different chemical products. Also, in the illustrated embodiment, the rotary cartridge 104 includes channels 212 arranged in two rings or concentric annular rows 216, each row 216 having a same number of channels 212. However, it should be readily understood that rotary cartridges 104 may include any number of channels 212 in any suitable arrangement, and the present disclosure is not limited by the particular number or arrangement of channels 212 shown in FIGS. 2 and 4. Moreover, although the channels 212 are depicted as all having approximately the same diameter, it should be readily understood that in other embodiments, a rotary cartridge 104 may include channels 212 of any size, including one or more channels 212 of differing sizes within a single cartridge 104. Various tablets 214, with different formulations, may be provided in a single rotary cartridge 104. In some embodiments, one row 216 of channels 212 of the rotary cartridge 104 houses tablets with a first formulation, and the other row 216 houses tablets with a second formulation. Any other arrangement of same or different tablets is contemplated within the scope of the present disclosure. Additionally, tablets of different sizes, shapes, and/or weight may be provided in the rotary cartridge 104.

The bottom end of each channel 212 defines an opening 218 in a bottom end of the magazine 210, at which tablets 214 are dispensed from respective channels 212, one at a time. Additionally, a corresponding notch 220 is defined in the bottom end of the magazine 210, tangentially adjacent to a corresponding opening 218.

Figure 6:
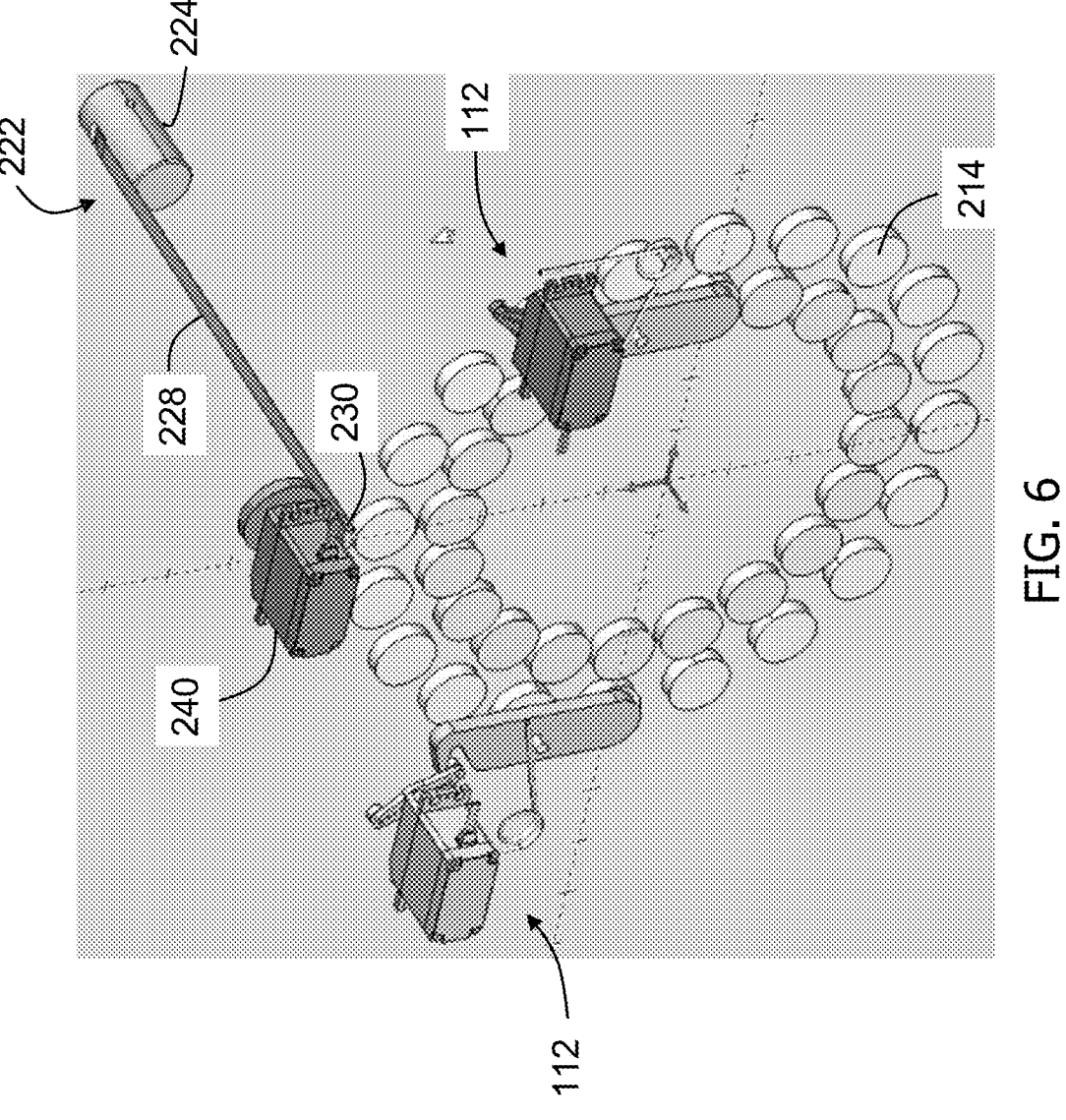
FIG. 6 is a perspective view of an arrangement of certain components of the material dispensing assembly shown in FIG. 2.
Figures 7, 8, 9:
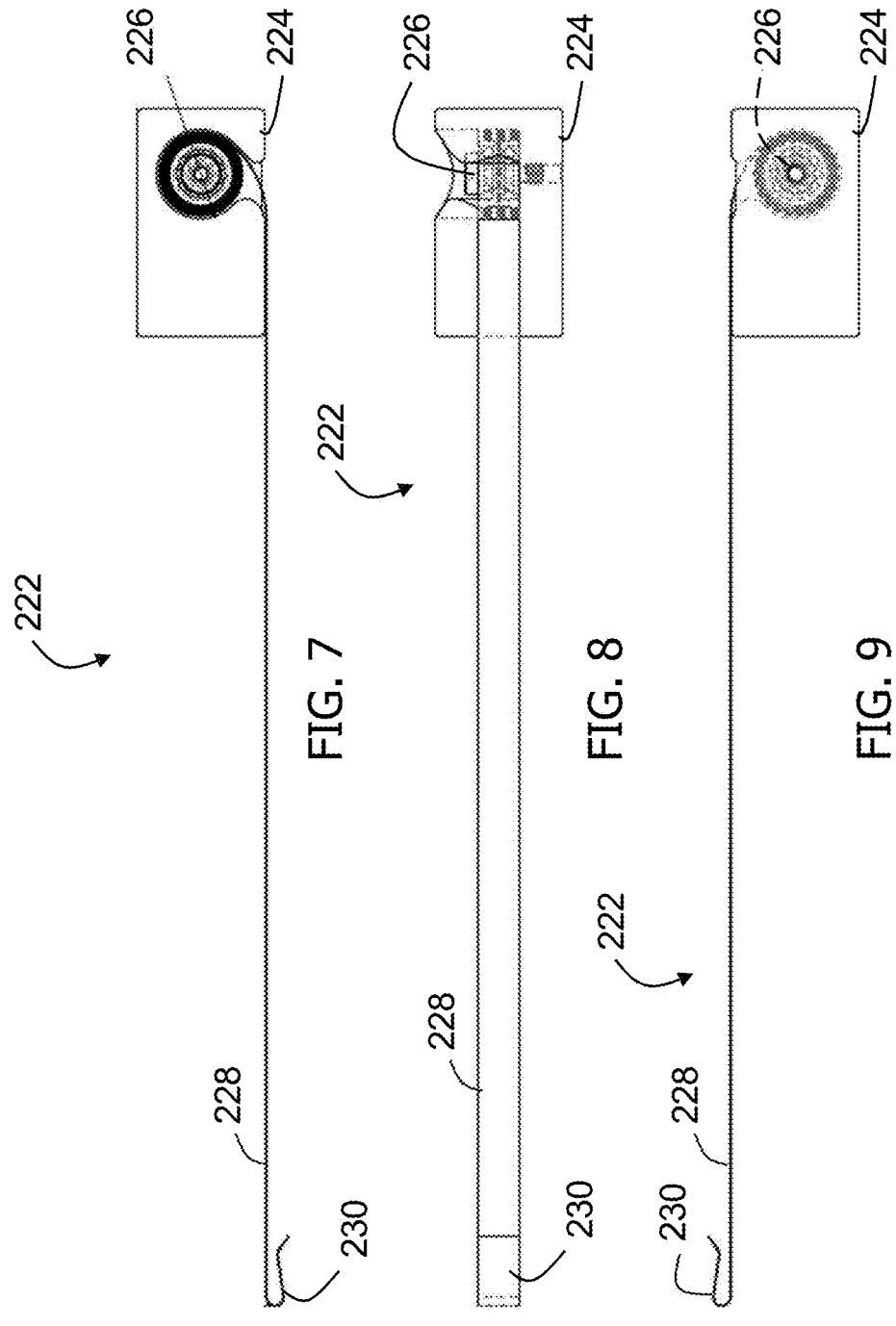
FIGS. 7-9 are left-ride, front, and rear views, respectively, of a discharge mechanism for use with the material dispensing assembly shown in FIG. 2.

A discharge mechanism 222 is positioned within each channel 212, as schematically shown in FIG. 6. Specifically, the discharge mechanism 222 extends axially through the respective channel 212, from the bottom end of the channel 212 towards a top end of the channel. With reference to FIGS. 6-9, the discharge mechanism includes a cassette 224 housing a spool 226, and an anchor 228 extending from the cassette. The anchor 228 is formed from a spoolable material, and may include a metallic, polymeric, or other inert material suitable for use within the channel 212. A terminal end 230 of the anchor 228 is received in a respective notch 220. The anchor 228 extends from the terminal end 230 thereof into the cassette 224, where it is wound about the spool 226. The spool 226 is biased to wind the anchor 228 therearound. This arrangement biases the cassette 224 downwards, or towards the bottom end of the channel 212. When the channel 212 contains tablets 214, the cassette 224 is positioned against a final, top-most tablet in the channel 212, adjacent to the top of the channel 212. A bottom edge of the cassette 224 is positioned against a top face of the final tablet. Because the cassette 224, via the anchor 228 and spool 226, is biased towards the bottom end of the channel 212, the cassette 224 exerts a downward force (e.g., towards the bottom end) on the final tablet—and, therethrough, every tablet in the channel 212. In this way, the discharge mechanism 222 maintains a downward bias on the tablets 214 retained in the channel 212.

At least one dispenser 112 is operatively coupled to the rotary cartridge 104 adjacent to the bottom end 202 of the rotary cartridge 104. In the illustrated embodiment, two dispensers 112 are operatively coupled to the rotary cartridge 104; in alternative embodiments, one, three, four, or more dispensers 112 are coupled to the rotary cartridge 104. Additionally, an indexing motor 240 is operatively coupled to the rotary cartridge 104. In the illustrated embodiment, the indexing motor 240 is also positioned at the bottom end 202 of the rotary cartridge 104; in alternative embodiments, the indexing motor 240 is positioned elsewhere, such as at the top end 204 of the rotary cartridge 104 or at a location intermediate the top end 204 and the bottom end 202.

The indexing motor 240 is configured to rotate, or index, the magazine 210 about the longitudinal axis 206, at a predictable rate or pattern or according to other specific instructions (e.g., from controller 124). Each time the indexing motor 240 indexes the magazine 210, a respective tablet 214 is provided to each dispenser 112, for dispensing from the material dispensing assembly 114.

Figure 3:
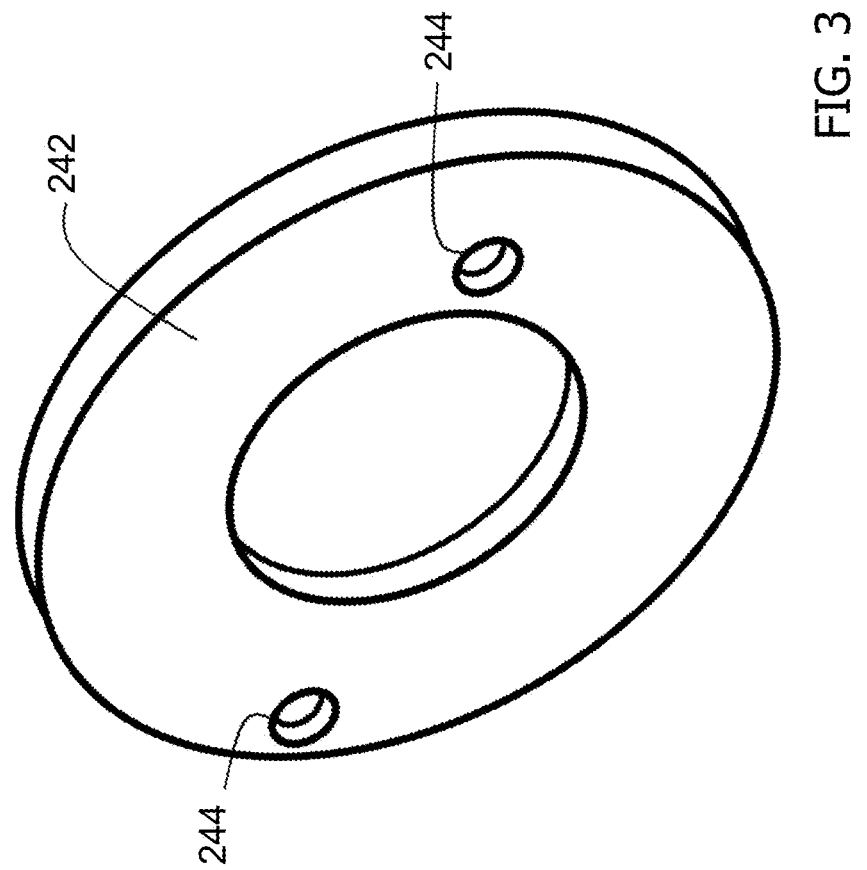
FIG. 3 is a perspective view of an end plate for use with the material dispensing assembly shown in FIG. 2.

In some embodiments, the bottom end of the magazine 210 is enclosed by an end wall or end plate 242, shown in FIG. 3. The end plate 242 is stationary with respect to the indexing motor 240, and includes one or more holes 244 therethrough, corresponding to the location(s) of the dispenser(s) 112. Accordingly, when the magazine 210 is indexed by the indexing motor 240, a different channel 212—and a tablet 214 contained therein—is aligned with a hole 244 and exposed to a dispenser 112. Due to the biasing force exerted by the discharge mechanism 222, the discharge mechanism 222 causes a tablet 214 to be dispensed from that channel 212, through the hole 244, and into the respective dispenser 112.

Figure 10:
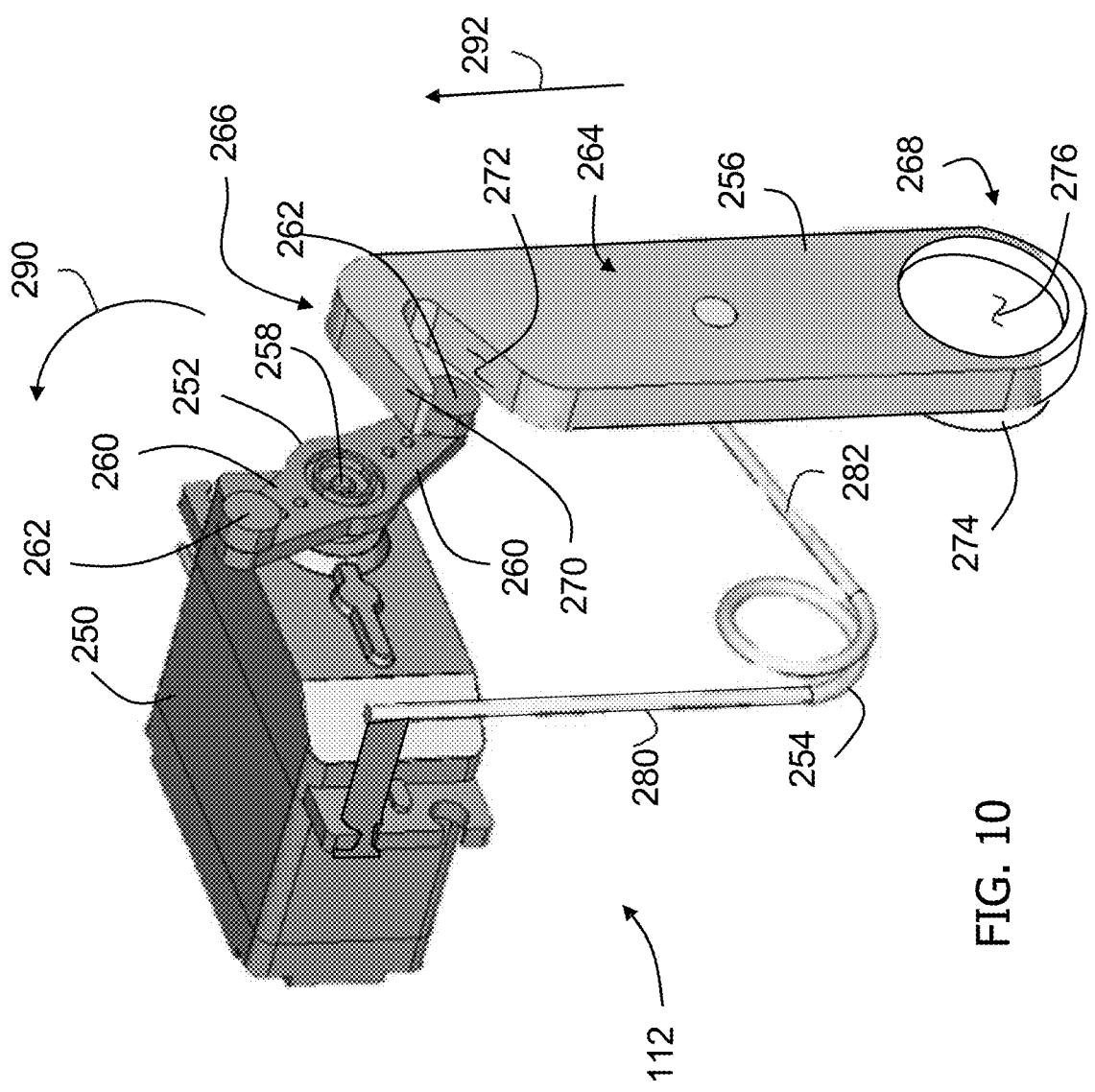
FIG. 10 is a first enlarged perspective view of a dispenser for use with the material dispensing assembly shown in FIG. 2.
Figure 11:
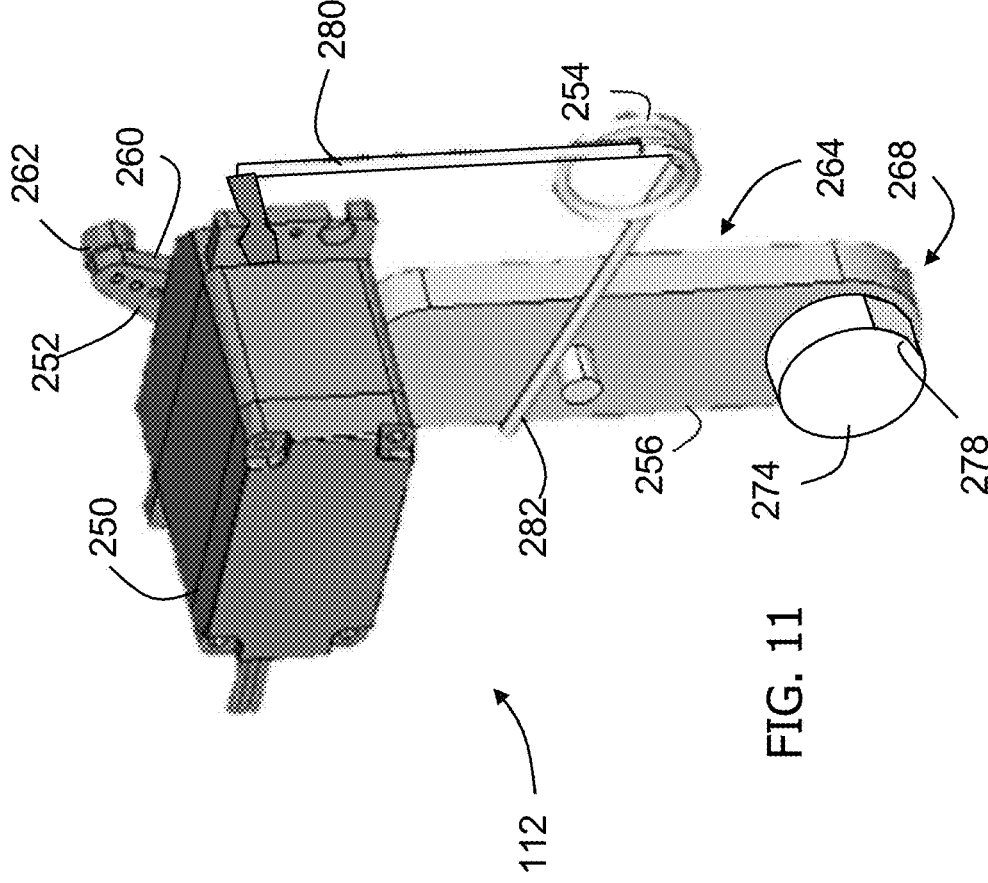
FIG. 11 is a second enlarged perspective view of the dispenser shown in FIG. 10.

Turning to FIGS. 10 and 11, an exemplary dispenser 112 is shown in greater detail. The dispenser 112 includes a motor 250, a rotating arm 252, a spring 254, and a hammer 256. The motor 250 may include, for example and without limitation, a continuously rotating servomotor. The rotating arm 252 is operatively coupled to the motor 250 by a shaft 258. The rotating arm 252 includes two opposing extensions 260, each extension 260 having a foot 262 extending therefrom.

The hammer 256 includes a body 264 with a first end 266 and a second end 268. The first end 266 includes a hook 270, which defines an inlet 272 extending through a portion of the first end 266 of the body 264. Each foot 262 of the extensions 260 of the rotating arm 252 is sized and shaped to be received in the inlet 272, and engage the hook 270 as the rotating arm 252 rotates. In this illustrated embodiment, the second end 268 of the body 264 includes a pocket 274 defining a cavity 276 therein, for receiving a tablet 214. The pocket 274 includes an outlet 278 defined in a side wall thereof. The spring 254 is embodied as a torsion spring, with a first leg 280 operatively coupled to the motor 250 and a second leg 282 operatively coupled to the hammer body 264.

In operation, the dispenser 112 is appropriately positioned with respect to the rotary cartridge 104 such that the pocket 274 of the hammer 256 is aligned with one of the holes 244 in the end plate 242 (e.g., located beneath the hole 244, when the rotary cartridge 104 is in the operational configuration). The indexing motor 240 indexes the magazine 210, and, under force from the discharge mechanism 222, a tablet 214 is discharged from a channel 212 aligned with the hole 244 in the end plate 242, through the hole 244, and into the pocket 274 of the hammer 256.

The rotating arm 252 is driven, through shaft 258, to rotate in a direction 290 by the motor 250, at some predictable rate or otherwise in response to control instructions (e.g., from the controller 124). As the rotating arm 252 rotates, the foot 262 engages the hook 270 of the hammer 256 and drives the hammer in a first direction 292. As the hammer 256 is driven in the first direction 292, the torsion spring 254 compresses. Eventually, as the rotating arm 252 continues to rotate in the direction 290, the foot 262 disengages from the hook 270. The torsion spring 254 releases tension, abruptly driving the hammer 256 back, in a second direction opposite to the first direction 292. This abrupt motion of the hammer 256 ejects the tablet 214 from the pocket 274, through the outlet 278 therein. The tablet 214 is ejected at a predetermined, known orientation, speed, and direction, for desired dispersal at a target location (e.g., a field, rice paddy, etc.).

Figure 12:
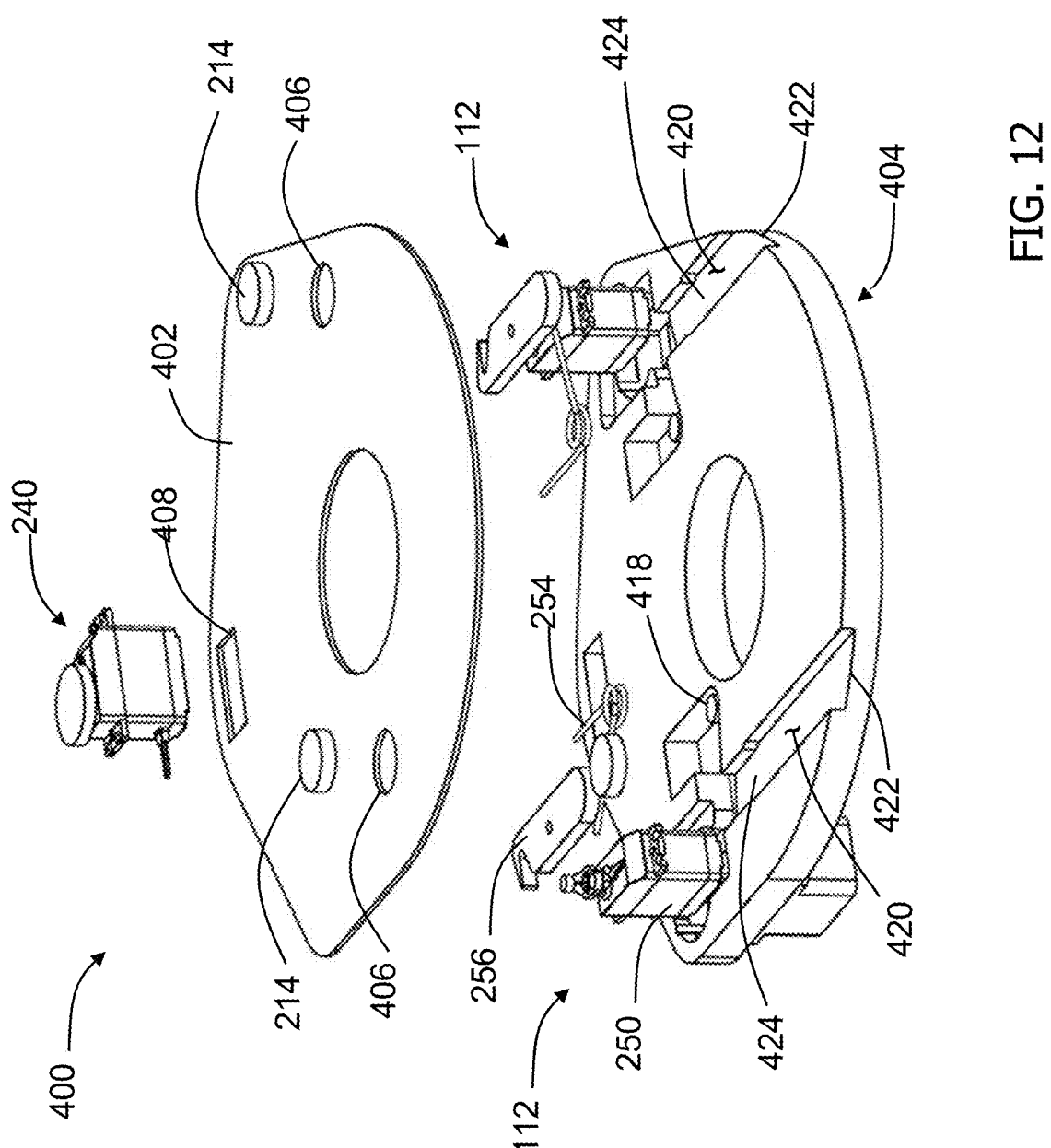
FIG. 12 is an exploded view of an exemplary end cap assembly suitable for use with the material dispensing assembly shown in FIG. 2.
Figure 13:
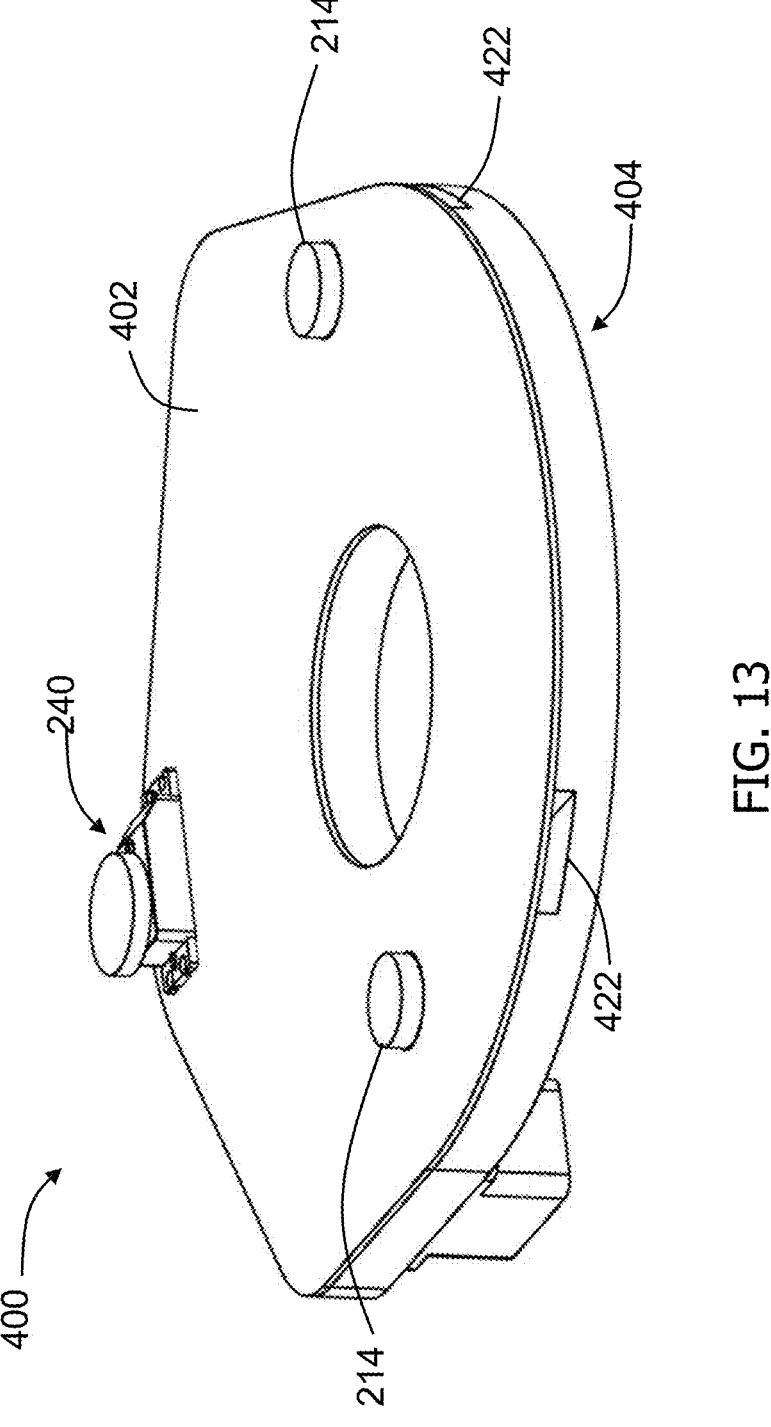
FIG. 13 is a perspective view of the end cap assembly shown in FIG. 12.
Figure 14:
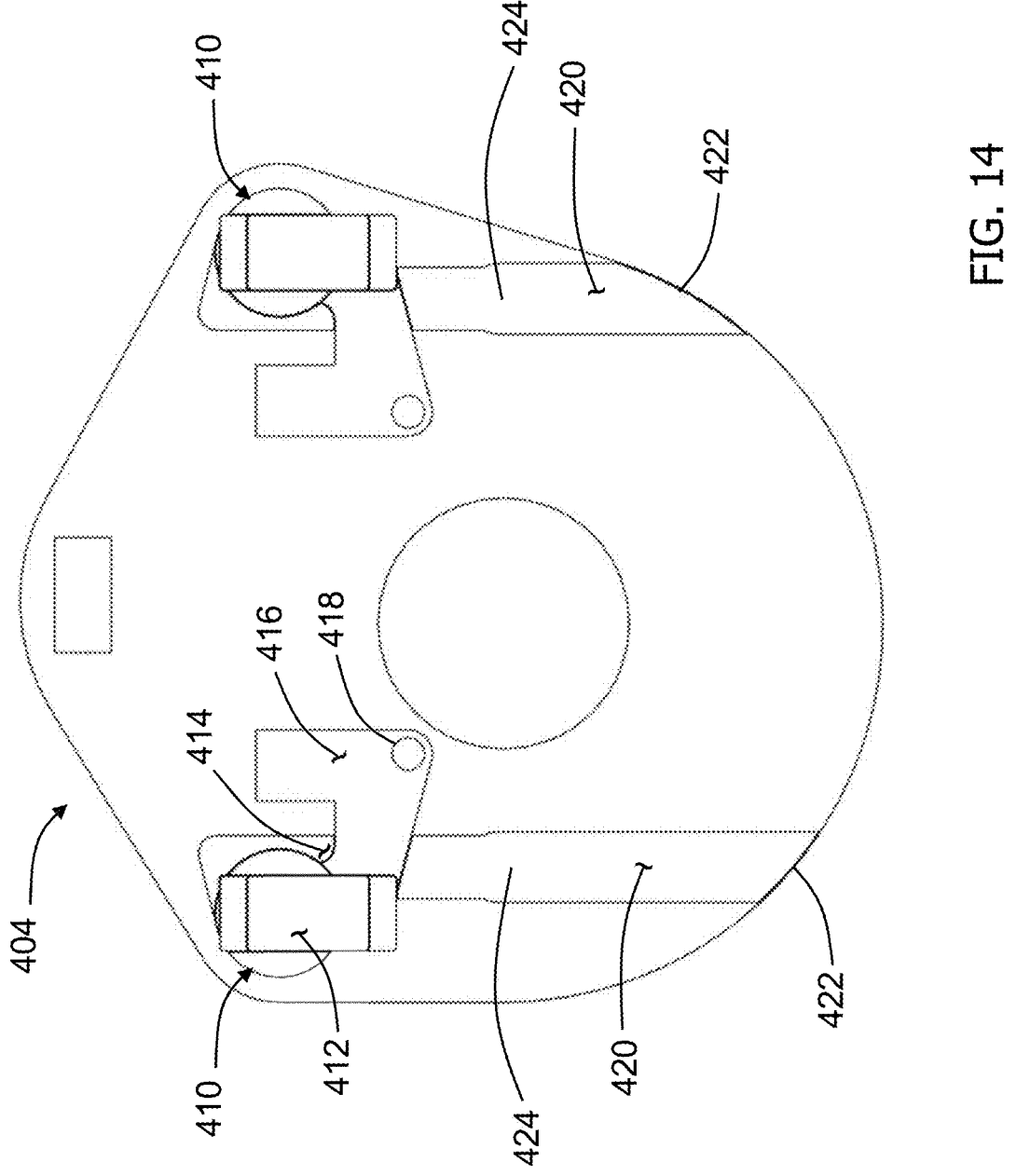
FIG. 14 is a top view of an end cap housing of the end cap assembly shown in FIG. 12.

In another example embodiment, the bottom end of the magazine 210 is enclosed by an end cap assembly 400, illustrated in FIGS. 12-14, that may house or include certain operational components of the material dispensing assembly 114, such as the dispenser 112 and the indexing motor 240. In the illustrated embodiment, the end cap assembly 400 includes an interior end wall or end plate 402 and an end cap housing 404 coupled to the end plate 402.

The interior end plate 402 has a similar construction and functions similarly to end plate 242. More specifically, the interior end plate 402 is positioned to abut the bottom end of the magazine 210 and is stationary with respect to the indexing motor 240. The interior end plate 402 includes one or more holes 406 therethrough that are each positioned so as to align with one of the channels 212—and a tablet 214 contained therein-when the magazine 210 is indexed or rotated by the indexing motor 240. In this embodiment, the interior end plate 402 also includes an opening or slot 408 to allow at least a portion of the indexing motor 240 to protrude therethrough, illustrated in FIG. 13.

The end cap housing 404 is also stationary with respect to the indexing motor 240. The end cap housing 404 has a plate-like structure, and defines a plurality of cavities and channels therein to receive components of the material dispensing assembly 114 therein, such as the dispenser 112 and the indexing motor 240. As illustrated in FIG. 14, for example, the example end cap housing 404 defines two dispenser cavities 410 that are each sized and shaped to receive a dispenser 112 therein. For example, each dispenser cavity 410 includes a motor portion 412 sized and shaped to receive the dispenser motor 250 therein, a spring portion 416 sized and shaped to receive the dispenser torsion spring 254 therein, and a hammer portion 414 sized and shaped to receive the dispenser hammer 256 therein. Additionally, the end cap housing 404 includes spring stem 418 associated with the spring portion 416 of each dispenser cavity 410. The torsion spring 254 of the dispenser 112 is coupled to the spring stem 418 when the end cap assembly 400 is assembled.

The end cap housing 404 also defines a tablet channel or chute 420 extending linearly from each dispenser cavity 410 to a respective dispensing outlet 422 located along a periphery of the end cap housing 404. An inlet end 424 of each tablet chute 420 is aligned with and positioned below one of the holes 406 in the end plate 402 to receive a tablet 214 therein. Each tablet chute 420 is also in-line with and parallel to the direction of motion of a respective index hammer 256 such that the index hammer 256 may extend into (fully or partially) the tablet chute 420 when the index hammer 256 is actuated by the motor 250 and torsion spring 254. In the illustrated embodiment, the tablet chute 420 has a width greater than a corresponding width of the hammer portion 414 of the dispenser cavity 410. In this embodiment, the hammer 256 does not include a pocket 274, cavity 276, or outlet 278, but instead engages the tablet 214 with the second end 268 of the body 264 (shown in FIGS. 10-11).

In operation, the indexing motor 240 indexes or rotates the magazine 210 such that channels 212 of the magazine 210 are aligned with the holes 406 in the interior end plate 402. The discharge mechanism 222 exerts a biasing force on tablets 214 within the channels 212, causing a tablet 214 to be dispensed through each hole 406 in the interior end plate 402, and into a respective tablet chute 420 in the end cap housing 404. The hammer 256 of each dispenser 112 is pulled back within the hammer portion 414 of the dispenser cavity 410 by rotation of rotating arm 252, causing the torsion spring 254 to compress, as described above. As the rotating arm 252 continues to rotate, the foot 262 reaches the release point and disengages from the hook 270, allowing the torsion spring 254 to release the tension stored therein and abruptly drive the hammer 256 forwards towards the tablet chute 420. The second end 268 of the hammer body 264 engages the tablet 214, and drives the tablet 214 through the tablet chute 420 towards and out of the outlet 422. In some embodiments, the tablet 214 is ejected through the outlet 422 at a predetermined, known orientation, speed, and direction, for desired dispersal at a target location (e.g., a field, rice paddy, etc.).

The material dispensing assembly 114 of the illustrated embodiments may also configured to facilitate flowable-product dispensing in conjunction with the tablet dispensing. In particular, as shown in FIGS. 2, 4, and 5, the rotary cartridge 104 may be annular in shape, with an open passage 294 at the center thereof. In at least some embodiments, a container 296 configured to store a flowable chemical product (e.g., a liquid, a powder, granules, etc.) may be positioned within the open passage 294 and coupled to the rotary cartridge 104 and/or to the UAV 102. A dispenser head 298 is coupled to the container 296, and may facilitate continuous and/or intermittent dispensing of the flowable product, in a flowing manner, a spray or aerosolized manner, and/or in any suitable way, depending on the type of dispenser head 298 and control thereof (e.g., by the controller 142). For example, where the flowable product is a liquid, the dispenser head 298 includes a fluid outlet or nozzle, such as without limitation, a flat fan, hollow cone, and/or spinningdisk type nozzle. Where the flowable product is a dry material, such as flowable granules and/or flowable powders, the dispenser head 298 includes at least one material spreader, such as a horizontal spreader or a vertical spreader, for example and without limitation, a rotary-type spreader. Product may be continuously or intermittently dispensed from the container 296, for example, according to control instructions from the controller 124. In this way, the flowable product may be dispensed before, during, or after the tablet(s) 214 are dispensed, for precise control according to desired dosing parameters.

Figure 15:
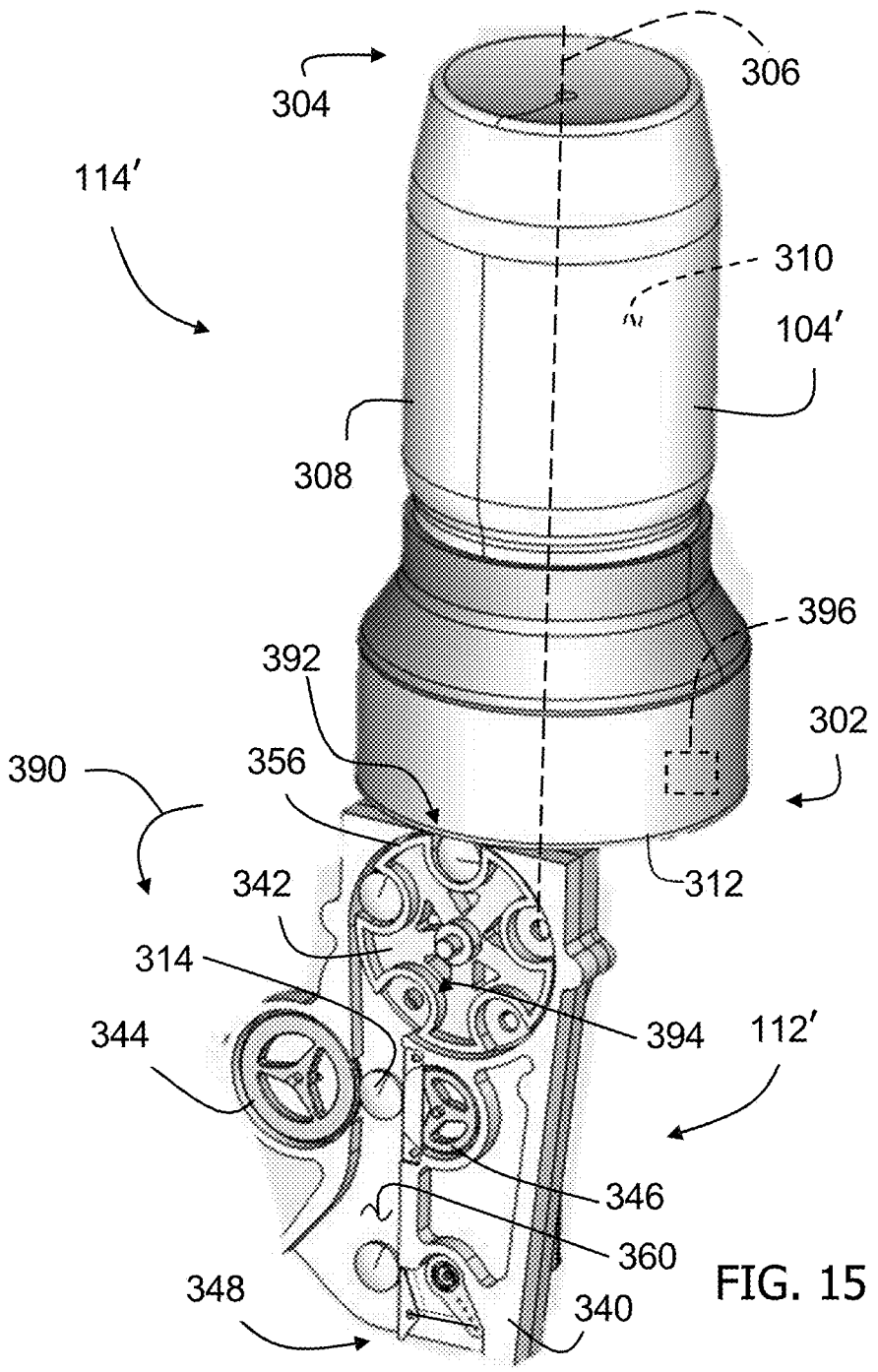
FIG. 15 is a perspective view of another exemplary material dispensing assembly for use with the material delivery system shown in FIG. 1.
Figure 16:
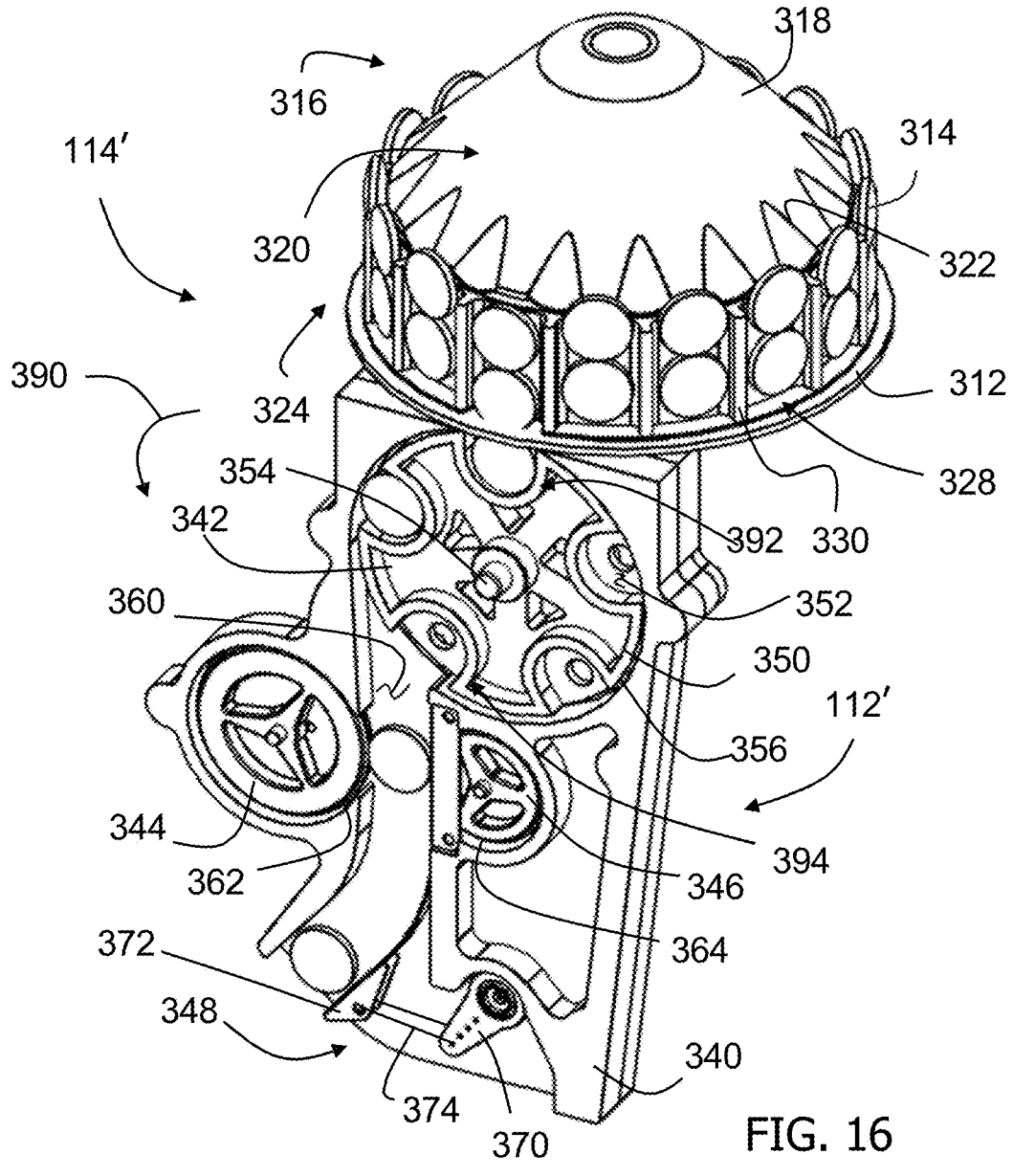
FIG. 16 is a cutaway view of the material dispensing assembly shown in FIG. 15.

Turning now to FIGS. 15 and 16, another embodiment of a material dispensing assembly 114, referred to with the designation 114', is depicted. Likewise, similar components to those shown and described with respect to FIG. 1 are also designated with a prime ('). As described above, the material dispensing assembly 114' is coupled to a UAV 102 (not shown in FIGS. 15 and 16) for operation to dispense chemical products at a target location.

In this embodiment, the rotary cartridge 104' has a slightly tapered shape, and extends from a wider first or bottom end 302 to a narrower second or top end 304. The designation "top" and "bottom" are used herein based on an operational configuration of the rotary cartridge 104' when the rotary cartridge 104' is coupled to the UAV 102 and in use. In this operational configuration, the first end 302 will be facing vertically downwards (e.g., towards a ground surface to be treated), and the second end 304 will be facing vertically upwards. The rotary cartridge 104' extends from the bottom end 302 to the top end 304 along a longitudinal axis 306.

Figure 17:
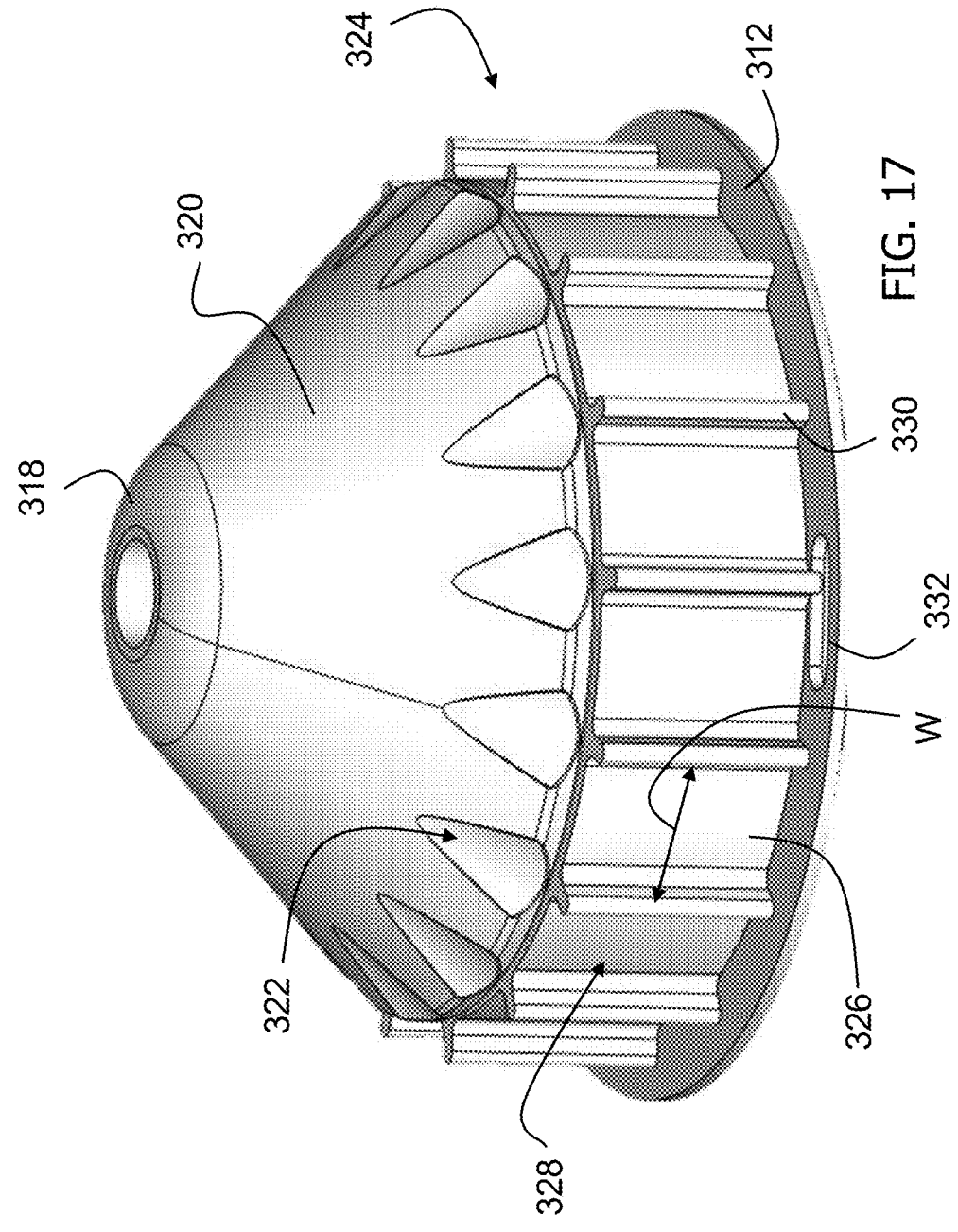
FIG. 17 depicts a portion of an indexing mechanism for use with the material dispensing assembly shown in FIG. 15.

The rotary cartridge 104' includes an outer shell 308 that extends from the top end 304 to the bottom end 302 and defines a cavity 310 therein. An end plate 312 corresponds to the bottom end 302 of the rotary cartridge 104'. A plurality of tablets 314 are retained within the cavity 310. An indexing mechanism 316 is housed in the outer shell 308, within the cavity 310 and adjacent to the end plate 312. As shown in FIGS. 16 and 17, the indexing mechanism 316 includes a conical distributor 318 having a convex, sloped top surface 320. A plurality of grooves 322 are defined in the distributor top surface 320. The indexing mechanism 316 also includes a magazine 324 circumscribing the distributor 318, the magazine 324 including a side wall 326 and defining plurality of channels 328 separated by radially extending walls 330. In the example embodiment, the distributor 318 includes a same number of grooves 322 as a number of channels 328 of the magazine 324. The indexing mechanism 316 also includes a first motor (not shown, which may be referred to as an indexing motor) housed within a chamber defined by the distributor 318.

The magazine channels 328 have a width W defined between adjacent walls 330. In the example embodiment, the channel width W is approximately equal to a size (e.g., diameter) of the tablets 314 retained in the rotary cartridge 104'. In addition, the end plate 312 includes at least one hole 332 defined therethrough. Each hole 332 has a width approximately equal to the channel width W. Additionally, the hole 332 is positioned at a predetermined radial distance from the longitudinal axis 306 of the rotary cartridge 104', such that the hole 332 axially aligns with the magazine channels 328.

In operation, the tablets 314 in the cavity 310 of the outer shell 308, under the force of gravity, are drawn along the conical top surface 320 of the distributor 318 and guided, via the grooves 322, into the channels 328. Additionally, the magazine 324 is rotated about the longitudinal axis 306, by the first motor, to distribute the tablets 214 evenly between the channels 328.

Figure 18:
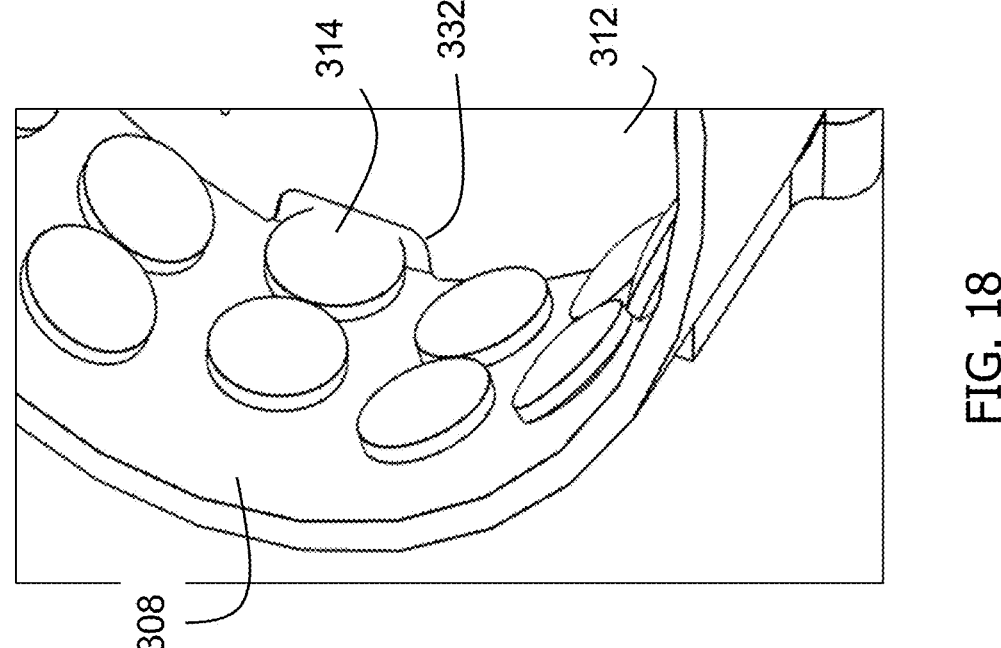
FIG. 18 is a partial view of indexed tablets within the material dispensing assembly shown in FIG. 15.

In particular, each tablet 314 is guided into a single channel 328 and retained in a discharge orientation within the channel 328, between the magazine side wall 326 and an interior surface of the outer shell 308. As used herein, the discharge orientation of the tablets 314 in the present embodiment refers to the orientation depicts in FIGS. 16, 18, and 22, in which the convex faces of the tablet 314 are oriented to face in a horizontal direction, parallel to a ground surface (not shown). Stated differently, the tablet 314 is "on its side", or side edge, in the discharge orientation.

At least one dispenser 112' is operatively coupled to the rotary cartridge 104' adjacent to the bottom end 302 of the rotary cartridge 104'. Only one dispenser 112' is shown in the illustrated embodiment. In another embodiment, a second dispenser 112' is coupled to the rotary cartridge 104' approximately 180° from the illustrated dispenser 112', such that the material dispensing assembly 114' includes two opposing dispensers 112'. In other embodiments, three, four, or any number of dispensers 112' are included.

The dispenser 112' includes a housing 340, a metering wheel 342, an ejection wheel 344, an idle wheel 346, and a guide mechanism 348. The metering wheel 342, ejection wheel 344, idle wheel 346, and guide mechanism 348 are retained within the housing 340. More specifically, the housing 340 is a two-piece molded component including specifically shaped, sized, and oriented cavities therein, to house the other components of the dispenser 112' as shown.

Figure 19:
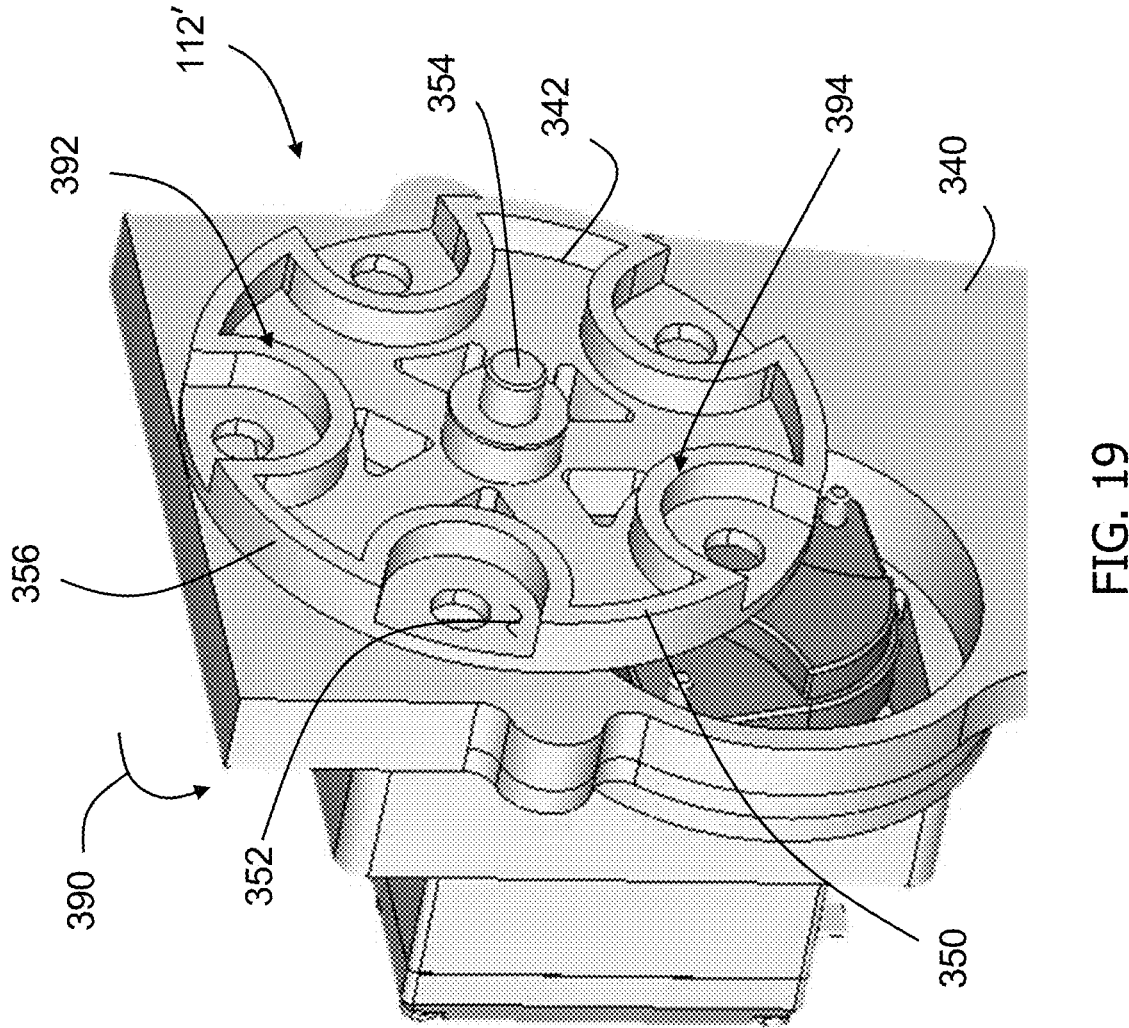
FIGS. 19-21 are partial cutaway views of a dispenser for use with the material dispensing assembly shown in FIG. 15.

With reference in particular to FIGS. 16 and 19, the metering wheel 342 includes a plurality of spokes 350 and defines a plurality of slots 352 between adjacent spokes 350. Each slot 352 is sized and shaped to accommodate a single tablet 314 therein. The metering wheel 342 is coupled to a shaft 354, which is rotated by a second motor (not shown). In some cases, the second motor may be the same as the first (indexing) motor. In such embodiments, the same indexing motor rotates the magazine 324 and rotates the metering wheel 342 (via the shaft 354) at a same angular speed, or at different angular speeds, depending on the mechanical connection therebetween. In other embodiments, two different motors rotate the magazine 324 and the metering wheel 342.

Figure 20:
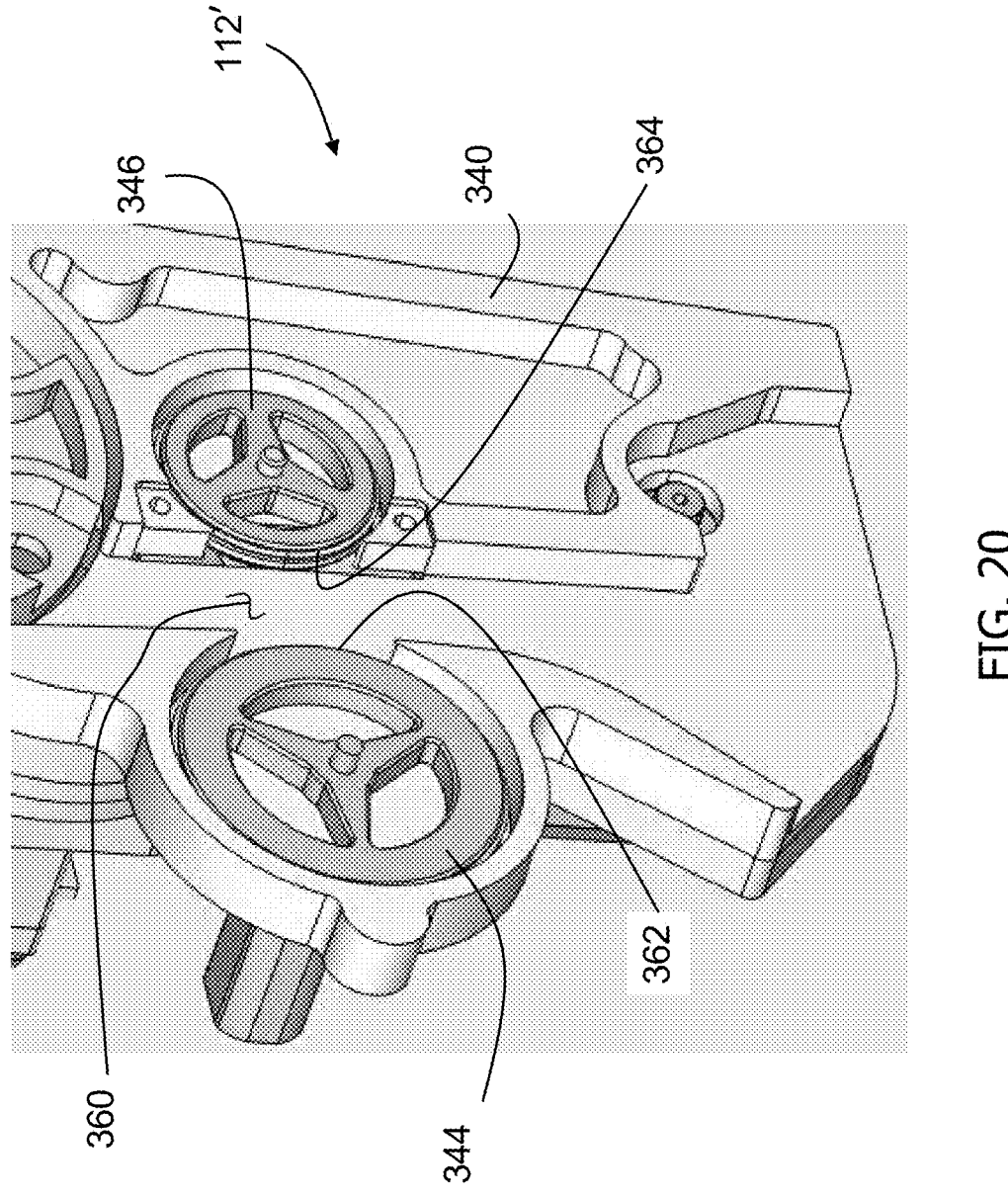

With reference now to FIGS. 16 and 20, the ejection wheel 344 and the idle wheel 346 are located adjacent to one another, downstream of the metering wheel 342. A passage 360 is defined between the metering wheel 342 and the ejection and idle wheels 344, 346. The ejection wheel 344 is located opposite the idle wheel 346, across the passage 360. The ejection wheel 344 has an outer surface 362 and is driven by a third motor (not shown) at a predetermined angular speed. The idle wheel 346, as its name suggests, is not actively driven and includes an outer surface 364. The third motor may be the same as the first and/or the second motor or may be a different motor.

Figures 21, 22:
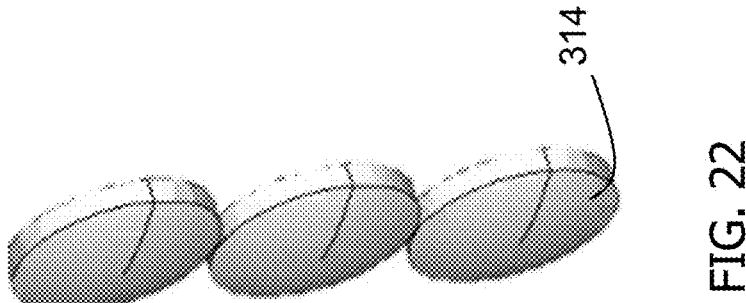
FIG. 22 is a perspective view of tablets for use with the material dispensing assembly shown in FIG. 15.

Turning to FIG. 21, the guide mechanism 348 includes a lever 370, a rail 372, and a connector 374 connecting a first end 376 of the lever 370 to a first end 378 of the rail 372. The second end 380 of the lever 370 is coupled to a pivot shaft 384. The rail 372 extends from the first end 378 to a second end 382, where the second end 382 is coupled to the housing 340 upstream of the first end 378. The rail 372 is formed from a flexible material (e.g., a metallic or polymeric material) that can be bent into a plurality of configurations based on a position of the rail first end 378.

In the exemplary embodiment, the lever 370 is rotated about the pivot shaft 384 to re-position the rail first end 378, via the connector 374. More specifically, the rail first end 378 is positioned, using the lever 370, based on a desired discharge direction of the tablets 314 to be dispensed from the dispenser 112'. The rail first end 378 may be positioned in a first position (see FIGS. 16 and 21) in a second position (see FIG. 15), and in any third position between the first position and the second position.

In operation, the metering wheel 342 is rotated in a direction 390 (counterclockwise, with respect to the view shown in FIGS. 15, 16 and 19), and the slots 352 are driven through a plurality of angular positions. At a first angular position 392, in which an entrance to the slot 352 is oriented towards the rotary cartridge 104', the slot 352 is aligned with the hole 332 in the end plate 312. A tablet 314 is discharged, under the force of gravity, through the hole 332 and into the slot 352 that is at the first angular position 392. As the metering wheel 342 is rotated further, the slot 352 retaining the tablet 314 is rotated in the direction 390 away from the hole 332, and an outer surface 356 of a spoke 350 overlies or blocks the hole 332. The metering wheel 342 continues to rotate, and this pattern continues: the hole 332 is exposed, a tablet 314 is discharged into a slot 352 in the first angular position 392, and the hole 332 is subsequently blocked by an adjacent spoke 350. This pattern ensures a predictable and precise metering of tablets 314 from the rotary cartridge 104'.

Simultaneously with the rotation of the metering wheel 342, the magazine 324 is rotated. The rotational speed of the magazine 324 is correlated with the rotational speed of the metering wheel 342, such that as a slot 352 reaches the first angular position 392 and is aligned with the hole 332 in the end plate 312, a channel 328 of the magazine 324 also aligns with the hole 332 in the end plate 312, such that a tablet 314, under the force of gravity, is discharged from the channel 328, through the hole 332, and into the slot 352 in the first angular position 392.

As the metering wheel 342 continues to rotate, the tablet 314 is retained in a respective slot 352, between adjacent spokes 350 and an interior wall of the housing 340. At a second angular position 394, in which the entrance to the slot 352 is aligned with the passage 360, the tablet 314, under the force of gravity, is dispensed from the metering wheel 342 and into the passage 360. As the tablet 314 falls through the passage 360, the tablet 314 encounters the outer surface 362 of the ejection wheel 344. The ejection wheel 344 is rotated at a predetermined angular speed based on the desired ejection speed for the tablet 314, from the dispenser 112'. As the tablet 314 passes between the ejection wheel 344 and the idle wheel 346, the tablet 314 is forced, by the outer surface 362 of the ejection wheel 344, towards an exit from the passage 360 at a predetermined ejection speed.

As the tablet 314 continues to traverse the passage 360, the position of the rail 372 guides the tablet 314 at a predetermined angle or path out of the passage 360, at the ejection speed (or a speed within a threshold of the ejection speed). When the rail first end 378 is in the first position, for example, the tablet 314 is dispensed from the dispenser 112' at an angle α relative to the longitudinal axis 306 or a vertical direction. When the rail first end 378 is in the second position, the tablet 314 is dispensed vertically downward, such that the angle α is about 0°. The angle α is selectively variable between about 0° and about 90°, depending on the particular characteristics of the passage 360 and the position of the rail 378. Therefore, the tablet 314 is dispensed or ejected from the dispenser 112' at a predetermined, known orientation, speed, and direction, for desired dispersal at a target location (e.g., a field, rice paddy, etc.).

With reference to FIG. 6, the tablets 214, in some embodiments, are cylindrical in shape with flat or planar faces. With reference to FIG. 22, in some embodiments, the tablets 314 are cylindrical or disk-shaped with convex faces. Other shapes of tablets 214/314 are contemplated within the scope of present disclosure. In some embodiments of the present disclosure, the rotary cartridge 104/104' is easily coupled to and decoupled from the UAV 102, such that the cartridge 104/104' is readily exchanged, replaced, or re-filled, and each cartridge 104/104' is provided full, or stocked with the desired number and arrangement of tablets. The cartridge 104/104' may have variable design characteristics to accommodate this number and arrangement of tablets, in virtually infinite configurations and dimensions. In some embodiments, for example, the cartridge 104/104' may house 1,000 or more tablets therein.

It should be readily understood that the controllable, predetermined motion of the material dispensing assembly 114/114', along with control of the UAV 102, facilitates accurate and predictable dispensing of the tablets 214/314 in a predetermined pattern at a target location. Specifically, the UAV 102 can be controlled and positioned such that the direction of an outlet from the dispenser 112/112' is known and oriented as desired. Moreover, the relative motion (e.g., speed, timing, position) of the components of the material dispensing assembly 114/114' can be adjusted to precisely control the timing and speed of the tablet dispensing. In some embodiments, although one tablet is dispensed into a dispenser 112/112' at a time, multiple dispensers 112/112' can be implemented, such that multiple (same or different) tablets can be simultaneously dispensed to a same location. Additionally or alternatively, the tablet dispensing can be precisely controlled to ensure that consecutively dispensed tablets are dispensed into a same location, or within a threshold distance from one another. Even further, various components of the material dispensing assembly 114/114' can be selected, exchanged, replaced, or adjusted, to even further refine the aerial material delivery system 100 for accurate and precise use, such as the arrangement of channels 212/328, the selection of tablets 214/314, the parameters of the motors 250 (shown in FIGS. 10 and 11) and the spring 254 (also shown in FIGS. 10 and 11), the size of various components, etc. Accordingly, the aerial material delivery system 100 of the present disclosure is highly customizable depending on the desired use thereof.

Components of the material dispensing assembly 114/114' are constructed from lightweight material, in the exemplary embodiment, and may further be constructed from recyclable and/or reusable material. In some embodiments, the rotary cartridge 104/104', the end plate 242/312, and/or the container 296 (shown in FIGS. 2, 4, and 5) are formed from a polymeric material.

Additionally, the rotary cartridge 104/104' and/or the container 296 may include one or more identifying features thereon. For example, one or more portions of the rotary cartridge 104/104' and/or the container 296 may include a unique identifier tag 396 (see FIGS. 2 and 15) that facilitates identification of a type and/or amount of the tablet(s) 214/314 contained within the rotary cartridge 104/104' and/or a type and/or amount of flowable material contained within the container 296. The identifier tag 396 may include, for example, a radio frequency identifier (RFID) tag. The identifier tag 396 is configured to wirelessly communicate with a tag reader (not shown) configured to read the identifying information from the identifier tag 396. The tag reader may be integrated into the UAV body 106, the controller 124, or any other components of the aerial material delivery system 100. Additionally or alternatively, the tag reader may be part of a separate device used to read the identifier tag (e.g., a handheld tag reader, not shown). The tag reader may include, for example, an RFID reader.

The tablets 214/314 may include any desired chemical formulation. In some embodiments, the tablets 214/314 are water-degradable, such that the tablets 214/314 dissolve or degrade when dispensing into a wet environment for application thereto.

The chemical and material delivery systems of the present disclosure are suitable for use with a wide variety of chemical products including, for example and without limitation, agrochemicals, such as fertilizers, insecticides, fungicides, nematocides, bactericides, acaricides, herbicides, herbicide safeners, growth regulators such as insect molting inhibitors and rooting stimulants, chemosterilants, semiochemicals, repellents, attractants, pheromones, feeding stimulants, other biologically active compounds or entomopathogenic bacteria, virus or fungi to form a multicomponent pesticide.

Figure 23:
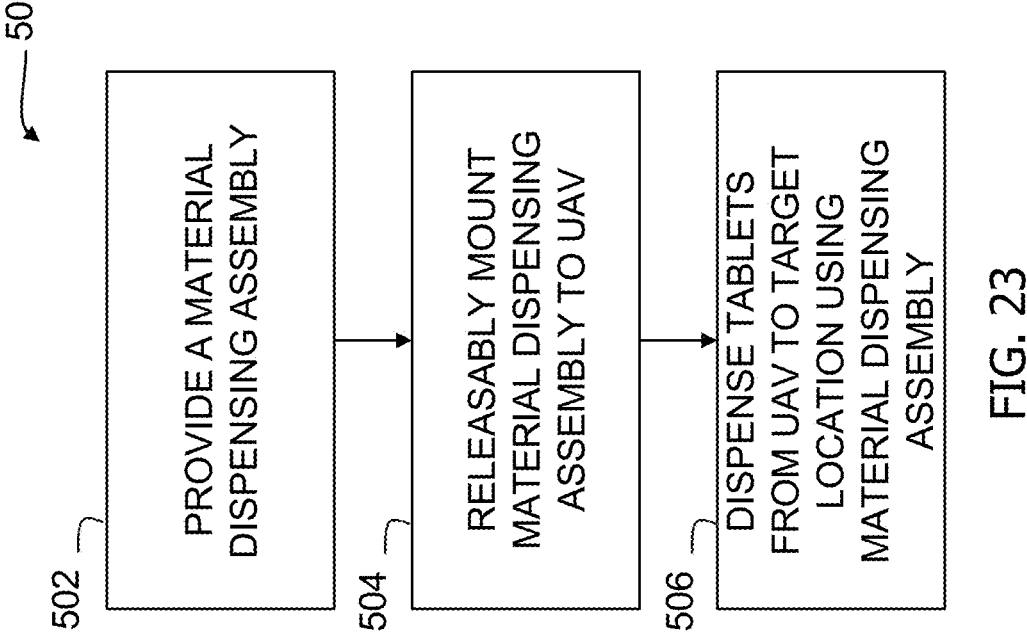
FIG. 23 is a flow diagram of a method of using or operating an aerial material delivery system, such as the aerial material delivery system shown in FIG. 1.

With reference now to FIG. 23, a flow diagram of a method 500 of using or operating the aerial material delivery system 100 shown in FIG. 1 is illustrated. In some embodiments, the method 500, including one or more steps thereof, may apply to the material dispensing assemblies 114 shown in FIGS. 2-21.

The method 500 includes providing 502 a material dispensing assembly that includes a rotary cartridge defining a plurality of channels extending parallel to a longitudinal axis of the rotary cartridge, each channel retaining a respective set of tablets therein, an indexing motor configured to index the channels, and a dispenser configured to dispense a single tablet at a time from the rotary cartridge to a target location. The method 500 also includes releasably mounting 504 the material dispensing assembly to an unmanned aerial vehicle (UAV), and dispensing 506 the tablets from the UAV to a target location using the material dispensing assembly.

In some embodiments, the method 500 includes additional, fewer, or alternative steps. For example, in some embodiments, dispensing 506 includes dispensing a single tablet at a time from the dispenser. In some embodiments, the material dispensing assembly further includes a second dispenser, and dispensing 506 includes dispensing a single tablet at a time from each of the dispenser and the second dispenser. In some embodiments, dispensing 506 includes operating the UAV such that the UAV flies over a field, and dispensing the tablets from the UAV while the UAV is flying over the field such that the tablets are dispensed onto the field.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to illustrate the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An aerial material delivery system comprising:
an unmanned aerial vehicle (UAV); and
a material dispensing assembly mounted to the UAV, the material dispensing assembly comprising:
a rotary cartridge defining a plurality of channels extending parallel to a longitudinal axis of the rotary cartridge, each channel retaining a respective set of tablets therein, wherein the rotary cartridge comprises a magazine, the magazine comprising a side wall and a plurality of radially extending walls extending from the side wall, wherein the plurality of channels are defined between respective adjacent ones of the radially extending walls;
an indexing motor configured to index the channels; and
a dispenser configured to dispense a single tablet at a time from the rotary cartridge to a target location; and an end wall having at least one opening therethrough, wherein the opening exposes a channel of the plurality of channels to the dispenser.

2. The system of claim 1, wherein the rotary cartridge comprises an outer shell, the outer shell surrounding the plurality of channels.

3. The system of claim 1, wherein the indexing motor indexes the magazine to align the channel with the opening in the end wall to dispense a tablet from the channel to the dispenser.

4. The system of claim 1, wherein the dispenser comprises a metering wheel configured to receive the single tablet from the rotary cartridge.

5. The system of claim 4, wherein the metering wheel comprises a plurality of spokes defining a respective plurality of slots therebetween, each slot configured to receive a respective tablet therein.

6. The system of claim 5, wherein each slot is configured to receive the respective tablet therein when the slot is in a first angular position, in which the slot is aligned with the opening in the end wall.

7. The system of claim 6, wherein, when the slot is in a second angular position, the respective tablet is released from the slot under the force of gravity.

8. The system of claim 1, wherein the dispenser includes an ejection wheel configured to rotate at a predetermined angular speed, to dispense the single tablet from the dispenser at a predetermined linear speed.

9. The system of claim 1, wherein the dispenser includes a guide mechanism, wherein the guide mechanism is selectively arranged between a first position and a second position to control an angle at which the single tablet is dispensed from the dispenser.

10. The system of claim 1, wherein the material dispensing assembly further comprises a second dispenser.

11. The system of claim 1, wherein the rotary cartridge further comprises a plurality of discharge mechanisms, each discharge mechanism retained in a corresponding channel of the plurality of channels.

12. The system of claim 1, wherein the dispenser comprises a motor, a rotating arm, a spring, and a hammer, wherein the rotating arm is rotated by the motor and the hammer is driven from a first position to a second position by the rotating arm, the spring causing the hammer to return from the second position to the first position under a spring force of the spring, to dispense the single tablet from the hammer at a predetermined speed.

13. The system of claim 1, wherein the material dispensing assembly further comprises a container retaining a flowable product therein.

14. A method comprising:

providing a material dispensing assembly including a rotary cartridge defining a plurality of channels extending parallel to a longitudinal axis of the rotary cartridge, each channel retaining a respective set of tablets therein, an indexing motor configured to index the channels, a dispenser and an end wall having at least one opening therethrough, wherein the opening exposes a channel of the plurality of channels to the dispenser and further wherein the rotary cartridge comprises a magazine, the magazine comprising a side wall and a plurality of radially extending walls extending from the side wall, wherein the plurality of channels are defined between respective adjacent ones of the radially extending walls;

releasably mounting the material dispensing assembly to an unmanned aerial vehicle (UAV); and dispensing the tablets from the UAV to a target location using the material dispensing assembly.

15. The method of claim 14, wherein dispensing the tablets from the UAV comprises dispensing a single tablet at a time from the dispenser.

16. The method of claim 14, wherein the material dispensing assembly further includes a second dispenser, and wherein dispensing the tablets from the UAV comprises dispensing a single tablet at a time from each of the dispenser and the second dispenser.

17. The method of claim 14, wherein dispensing the tablets from the UAV comprises:

operating the UAV such that the UAV flies over a target location, such as a field; and dispensing the tablets from the UAV while the UAV is flying over the field such that the tablets are dispensed onto the field.

\* \* \* \* \*